US007149983B1

(12) United States Patent
Robertson et al.

(10) Patent No.: US 7,149,983 B1
(45) Date of Patent: Dec. 12, 2006

(54) USER INTERFACE AND METHOD TO FACILITATE HIERARCHICAL SPECIFICATION OF QUERIES USING AN INFORMATION TAXONOMY

(75) Inventors: George G. Robertson, Seattle, WA (US); Steven Drucker, Bellevue, WA (US); Daniel C. Robbins, Seattle, WA (US); Kim Cameron, Bellevue, WA (US); Timothy K. Olson, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 10/141,233

(22) Filed: May 8, 2002

(51) Int. Cl.
*G06F 13/00* (2006.01)
*G06F 15/00* (2006.01)
(52) U.S. Cl. .................. 715/810; 715/805; 715/763
(58) Field of Classification Search ............ 715/762, 715/763, 765, 805, 810, 853, 854
See application file for complete search history.

(56) References Cited

U.S. PATENT DOCUMENTS

| 5,826,010 | A | * | 10/1998 | Joseph et al. ................ 726/4 |
| 5,842,203 | A | | 11/1998 | D'Elena et al. |
| 6,169,992 | B1 | * | 1/2001 | Beall et al. ............ 707/103 R |
| 6,385,604 | B1 | * | 5/2002 | Bakalash et al. ............ 707/3 |
| 2003/0144868 | A1 | * | 7/2003 | MacIntyre et al. ............ 705/1 |

OTHER PUBLICATIONS

Allison Druin, et al.; "KidPad: A Design Collaboration Between Children, Technologists, and Educators"; http://www.acm.org/sigs/sigchi/chi97/proceedings/briefing/ajd2.htm (Mar. 22, 1997).

Steve Pollitt; "CeDAR: Center for Database Access Research," http://www.ariadne.ac.uk/issue4/cedar/. (Jun. 15, 1996).

A. Steven Pollitt; "Interactive Information Retrieval based on Faceted Classification Using Views", http://poseidon.hud.ac.uk/external/research/CeDAR/dorking.htm. (Mar. 16, 2000).

A. Steven Pollitt et al.; "View-Based Searching System- A New Paradigm for Information Retrieval Based On Faceted Classification and Indexing using Mutually Constraining Knowledge-Based Views", http://poseidon.hud.ac.uk/external/research/CeDAR/bcshci.htm. (Sep. 17, 1996).

A. Steven Pollitt; "The Key Role of Classification and Indexing in View-Based Searching." http://poseidon.hud.ac.uk/external/research/CeDAR/pollifla.html. (Aug. 31, 1997).

"Magical Management Capabilities with VI Network Wizard." IT Resource Management. (Mar. 2001).

Ben Shneiderman et al.; "Visualizing Digital Library Search Results with Categorical and Hierarchial Axes." University of Maryland; Published Jun. 2, 2000.

Flip Korn, et al., "Navigating Terminology Hierarchies to Access a Digital Library of Medical Images", University of Maryland, Dept. of Computer Science Technology Report, 1995, 12 pages.

Ronen Feldman, et al., "Mining Associations in Text in the Presence of Background Knowledge", In Proceedings of the Second International Conference on Knowledge Discovery form Databases, 1996, 4 pages.

(Continued)

*Primary Examiner*—Cao (Kevin) Nguyen
(74) *Attorney, Agent, or Firm*—Amin & Turocy, LLP

(57) ABSTRACT

A user interface, system, and method are disclosed to facilitate specification of queries and displaying corresponding results. The user interface presents the user with dimensions that contain one or more headings arranged according to an information taxonomy, which can vary based on the intended implementation for the system and user interface. A corresponding filter or query is constructed based on the user selecting of one or more headings. The filter is applied to one or more databases to return results that satisfy the filter. The results are presented in the user interface and can include interactive items based on a particular query as well as can correspond to a fully specified task.

53 Claims, 28 Drawing Sheets

OTHER PUBLICATIONS

Ronen Feldman, et al., "Mining Text Using Keywords Distributions", Journal of Intelligent Information Systems, 1998, 20 pages, Netherlands.

Ben Shneiderman, et al., "Visualizing Digital Library Search Results with Categorical and Hierarchical Axes", Human-Computer Interaction Laboratory, Department of Computer Science and Institute for Systems Research, 2000, 13 pages.

KidPad, available at: http://www.cs.umd.edu/hcil/kiddesign/kidpad.shtml, last accessed Jan. 3, 2003, 4 pages.

Steve Pollitt, "CeDAR: Centre for Database Access Research", available at: http://www.ariadne.ac.uk/issue4/cedar, last updated Jul. 15, 1996, last accessed May 13, 2004, 4 pages.

Steve Pollitt, et al., "CeDAR: Publications, View-based Searching Systems—A New Paradigm for Information Retrieval Based on Faceted Classification and Indexing Using Mutually Constraining Knowledge-Based Views", available at: http://scom.hud.ac.uk/external/research/groups/cedar/publications/bcshci.php, last updated Sep. 27, 2004, last accessed May 13, 2004, 10 pgs.

* cited by examiner

| Do | Who | Subject | Property | When | Type | Device | where |
|---|---|---|---|---|---|---|---|
| Create | Self | Entertainment | Size | New | Document | Television | indoor |
| Edit | Friend | Business | Status | Today | Show | Web | outdoor |
| Delete | Family | Shopping | Priority | Yesterday | Message | DVD | home |
| Talk | Co-worker | Computing | Creator | This Week | Game | VCR | work |
| View | Business | News | Owner | Last Week | Article | CD | travel |
| Play | Government | Weather | Expiration | 2 Weeks Ago | Music | Xbox | My City |
| Search | | Lifestyle | Price | This Month | Picture | Telephone | Other City |
| Send | | Travel | Version | This Year | Video | Camera | My Country |
| Forward | | Education | Comments | Before this year | Event | PC | Other Country |
| Reply | | Sports | Name | | Conversation | Cell Phone | Long/Lat/GPS |
| Other | Other | Other | Other | Other | Other | Other | Other |

FIG. 4

| Do | Who | Subject | Property | When | Type | Device | where |
|---|---|---|---|---|---|---|---|
| Create | Self | Entertainment | Size | New | Document | Television | indoor |
| Edit | Friend | Business | Status | Today | Show | Web | outdoor |
| Delete | Family | Shopping | Priority | Yesterday | Message | DVD | home |
| Talk | Co-worker | Computing | Creator | This Week | Game | VCR | work |
| View | Business | News | Owner | Last Week | Article | CD | travel |
| Play | Government | Weather | Expiration | 2 Weeks Ago | Music | Xbox | My City |
| Search | | Lifestyle | Price | This Month | Picture | Telephone | Other City |
| Send | | Travel | Version | This Year | Video | Camera | My Country |
| Forward | | Education | Comments | Before this year | Event | PC | Other Country |
| Reply | | Sports | Name | | Conversation | Cell Phone | Long/Lat/GPS |
| Other | Other | Other | Other | Other | Other | Other | Other |

| | | |
|---|---|---|
| John Smith | 7/2/2001 | Updated Sales Figures |
| | 7/4/2001 | Supplier Notes |
| | 7/30/2001 | Contract Negotiation Guidelines |
| | 7/17/2001 | Price Realignment Proposal |
| Tony Roberts | 7/2/2001 | Updated Sales Figures |
| | 7/23/2001 | Market Report from Asia |
| | 7/4/2001 | Supplier Notes |
| | 7/14/2001 | Product SKU list |
| Linda Michaels | 7/23/2001 | Market Report from Asia |
| | 7/14/2001 | Morale Event Budget |
| Jan French | 7/4/2001 | Supplier Notes |
| | 7/30/2001 | Contract Negotiation Guidelines |
| | 7/17/2001 | Price Realignment Proposal |
| Trent Armitage | 7/2/2001 | Updated Sales Figures |
| | 7/30/2001 | Contract Negotiation Guidelines |

FIG. 23

| | | |
|---|---|---|
| John Smith<br>Tony Roberts<br>Trent Armitage | 7/2/2001 | Updated Sales Figures |
| Tony Roberts<br>Linda Michaels<br>Frank Sandler | 7/23/2001 | Market Report from Asia |
| John Smith<br>Tony Roberts<br>Jan French | 7/4/2001 | Supplier Notes |
| Jan French<br>Trent Armitage<br>Suzie Oliver<br>John Smith | 7/30/2001 | Contract Negotiation Guidelines |
| Trent Armitage<br>Frank Sandler | 7/14/2001 | Product SKU list |

| To - Employees | Who - Title | Subject - Email Lists | Properties | When | Type | Device - Assets | Where |
|---|---|---|---|---|---|---|---|
| Create FT Pos | SDE | Business Funcs | Hire Date | This Month | Full Time | Desktop PCs | North America |
| Create Cont. Pos | Admin | Social Aliases | Hire Status | Last Month | Contractor | Laptops | South America |
| Remove | PM | Admin | End Date | This Fiscal Year | Vendor | Printers | Europe |
| Edit | Account Mngr | Research | Manager | Last Fiscal Year | | AV | Eastern Europe |
| Report | Test | Benefits | Pending | Exact Date | | Furniture | Asia |
| Print | Producer | Vendor Relations | Approved | | | Peripherals | Far East |
| | Designer | Support | Employee Num. | | | Special | Africa / Mid East |
| | Legal | Beta | | | | | Oceania |
| | Support | | | | | | |
| Other | Other | Other | Other | Other | Other | Other | Other |

FIG. 31

| Do | Who - Family | Subject | Properties | When | Type | Device | Where |
|---|---|---|---|---|---|---|---|
| View | Myself | Vacation | Start Time | This Month | Show | Television | Living Room |
| Pay | Mom | Work Week | Stop Time | Last Month | Message | DVD | Den |
| Set | Dad | Weekend | Week Schedule | This Fiscal Year | Game | Refrigerator | Dining Room |
| Stop | Sister | Security | Vacation Sched | Last Fiscal Year | Music | Furnace | Master Bedroom |
| Previous | Baby-sitter | | Duration | Exact Date | Picture | Air-Conditioner | My Room |
| Next | Guest | | Priority | Day | Video | Burgaler Alarm | Sister's Room |
| Return | Other Family | | | Night | Alert | Telephone | Kitchen |
| Record | Repair People | | | Morning | | CC Cameras | Dn Bathroom |
| Erase | Utilities | | | | | Radio | Up Bathroom |
| | | | | | | | Basement |
| Other | Other | Other | Other | Other | Other | Other | Other |

FIG. 32

| Do-Processing | Subject | Properties | Type - Select |
|---|---|---|---|
| Create | Font | Style | Picture |
| Cut | Paragraph | Color | Word |
| Copy | Bullets | Thickness | Line |
| Paste | Border | Border | Sentence |
| Print | Number | Format | Paragraph |
| Send To... | | Size | Section |
| Lockup | | Justification | Page |
| Undo | | Spacing | Chapter |
| Comment | | Indenting | Book |
| Search | | Count | Headers |
| Other | Other | Other | Other |

FIG. 33

| People | Topics | Projects | Files | Dates |
|---|---|---|---|---|
| A - D | Artificial Intelli... | Insite | Publications | New |
| D - G | Audio | TransTele3 | Tech Reports | Today |
| G - K | Collaboration | FOTM-H | Press Releases | Yesterday |
| K - N | Computer Gra... | Cross-Fade | Videos | This Week |
| N - P | Data Mining | InterMedia | Slides | Last Week |
| P - S | Electronic Co... | VisualDiver | Demos | 2 Weeks Ago |
| S - T | Gaming | UbiSodo | Software | This Month |
| T - U | Machine Lear... | WireUnWire | | This Year |
| V - Z | Video | ScaleSite | | Before this year |
| Num | Virtual Reality | MFH-32 | | |
| Other | Other | Other | Other | Other |

FIG. 35

USER INTERFACE AND METHOD TO FACILITATE HIERARCHICAL SPECIFICATION OF QUERIES USING AN INFORMATION TAXONOMY

TECHNICAL FIELD

The present invention relates generally to computer programming and, more particularly, to a user interface and method that represents a diverse information taxonomy to facilitate specifying queries and interactively displaying corresponding results.

BACKGROUND OF THE INVENTION

Various types of user interfaces have been developed to facilitate access to data arranged in one or more databases. The interfaces typically present data according to how the data is arranged in the database.

One commonly utilized database structure is a hierarchical database model. A hierarchical database corresponds to a type of database management system that links records together in a tree structure. For example, the hierarchical model includes a root node and children nodes that depend acyclically from the root node. In a traditional hierarchical model, each node can have at most one parent node, although any number of children.

Another database structure is a network database model, which is similar to the hierarchical model. But instead of using a single-parent tree hierarchy, the network model employs set theory to provide a tree-like hierarchy with the exception that children nodes can have more than one parent. This enables the network model to support various interrelationships that are usually absent from the pure hierarchical model.

One particular use of a network model relates to a metadirectory service. For example, a metadirectory corresponds to a centralized service that collects information from different data sources, such as different directories throughout an organization. The metadirectory combines all or a portion of the collected information into an integrated, unified view via an associated user interface. In a business organization, for example, a metadirectory can combine disparate information into a single, logical directory, such as based on identity information in e-mail applications, human resource systems, network operating system directories, and other corporate systems. The metadirectory thus facilitates presentation of information about an object, such as a person or network resource, that is contained throughout the organization.

Typically, user interfaces to the foregoing and other types of database systems have several shortcomings. For example, conventional user interfaces are specialized for a particular application and, as such, are generally inflexible to adaptations. Additionally, due to customization for a particular purpose, users often are confronted with a diverse set of front-ends that each requires training.

While some user interfaces attempt to provide a generalized front-end, these approaches tend to require users to construct complex queries using arcane interfaces that in themselves may require significant training. In addition, user interfaces for databases tend to exhibit delays from when a query is submitted to when results are presented to the user. For example, most database front-ends require user to construct a query, submit the query to the database engine, then wait for the presentation of the results. Frequently, due to an imprecise query on the part of the user, imperfect knowledge about what question to ask, or the improper use of the predefined query language, a user will be presented with either too many or too few results. This discourages users from attempting many different iterations on a query. Because conventional approaches make effective querying a slow process, it is often difficult for the user to understand the relationship between selected criteria and resulting views of the database.

Most database front-ends present a fixed view of the set of query criteria. Users can only choose from one level of granularity for particular criteria. This makes it very difficult (or even impossible) for a user to easily narrow or broaden the applicability of a particular criteria, as any changes to a current query usually require submission and processing of a new query.

Most database front-ends also present a fixed view of their inherent information taxonomy. This taxonomy is usually based on how the data is stored in the database. Users, who are not familiar with the search terms that are presented, however, are often frustrated when they cannot find the search term they need.

Current database systems are generally not used for accessing large command sets. Their user interfaces have not been tuned to present commands (actions) and their relationships to actionable items.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to a user interface, system, and method to facilitate specifying queries. A user is presented with a collection of dimensions that contain one or more headings arranged according to an information and/or command taxonomy. The headings can be selected based on the intended implementation for the system and user interface and can be extracted from metadata (including metadata derived from analysis of the content of the items in the database) associated with various commands and database items. The headings and dimensions are presented as display objects that a user can employ to generate a corresponding filter or query. For example, a user can iteratively select among one or more headings and subheadings to define a filter, which is applied to one or more databases. Corresponding results that satisfy the filter are presented to the user based on the filter generated for the selection(s). The results can be displayed as one or more user-selectable interactive items, such as graphics and/or text corresponding to the selected heading(s). Selection of such items can provide additional information as well as can implement actions for commands specified by the items. When a command is implemented via the user interface, the corresponding result can correspond to a fully specified task. Further, the concurrent presentation of headings and results for a filter facilitate iterative searching and implementation of associated tasks.

According to one aspect of the present invention, a user is presented with an indication of the query constructed from the one or more selections. By way of example, the system can include a natural language generator that provides a corresponding natural language sentence for a query entered by selecting one or more headings. Alternatively or additionally, the user can enter a natural language query (e.g., textually or verbally) with headings being selected based on the query. The conversion between natural language and heading selections helps the user understand the information taxonomy as well as the operators used to implement queries.

A heading within a given dimension can have multiple associated subheadings, such as can be employed to narrow a query. Thus, a user can select more than one heading and/or subheading to construct a filter having multiple levels of granularity. Feedback can also be presented to the user (e.g., textual and/or graphical indication) indicate the relevance or irrelevance of particular headings and subheadings relative to a current filter being implemented. Thus, the feedback provides a cue that enables a user to ascertain whether certain headings or subheadings would be constructive refinements to the current filter.

According to yet another aspect of the present invention, selections from one or more users can be employed to modify the taxonomy so as to provide a more user-friendly presentation of the taxonomy for these and/or other subsequent users. As a result, the user interface and associated taxonomy can adapt and improve through use.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 4 is an example of a user interface for an information/command taxonomy in accordance with an aspect of the present invention.

FIG. 5 is an example of selecting a heading in a user interface in accordance with an aspect of the present invention.

FIG. 23 is an example of part of a user interface displaying results sorted in accordance with an aspect of the present invention.

FIG. 24 is an example of part of a user interface displaying results sorted in accordance with an aspect of the present invention.

FIG. 30 is an example of a user interface configured for an internal business application in accordance with an aspect of the present invention.

FIG. 31 is an example of a user interface configured as a command interface for home device control applications in accordance with an aspect of the present invention.

FIG. 32 is an example of a user interface configured as a command interface for simple word processing in accordance with an aspect of the present invention.

FIG. 33 is an example of a user interface configured for accessing a corporate research database in accordance with an aspect of the present invention.

FIG. 35 is a screen shot illustrating an example of a user interface configured to display results of a business transaction implemented in accordance with an aspect of the present invention.

DESCRIPTION OF THE INVENTION

The present invention relates generally to a user interface, system, and method to facilitate specification of queries and display of corresponding results. The user interface presents the user with dimensions that contain one or more headings arranged according to an information taxonomy, which can vary based on the intended implementation for the system and user interface. A corresponding filter or query is constructed based on the user selecting of one or more headings. The filter is applied to one or more databases or metadatabases to return results that satisfy the filter. The results are presented in the user interface and can include interactive graphical and/or textual items corresponding to information results of a particular query and/or to actions that can be performed as a fully specified command or task.

Figure 1:
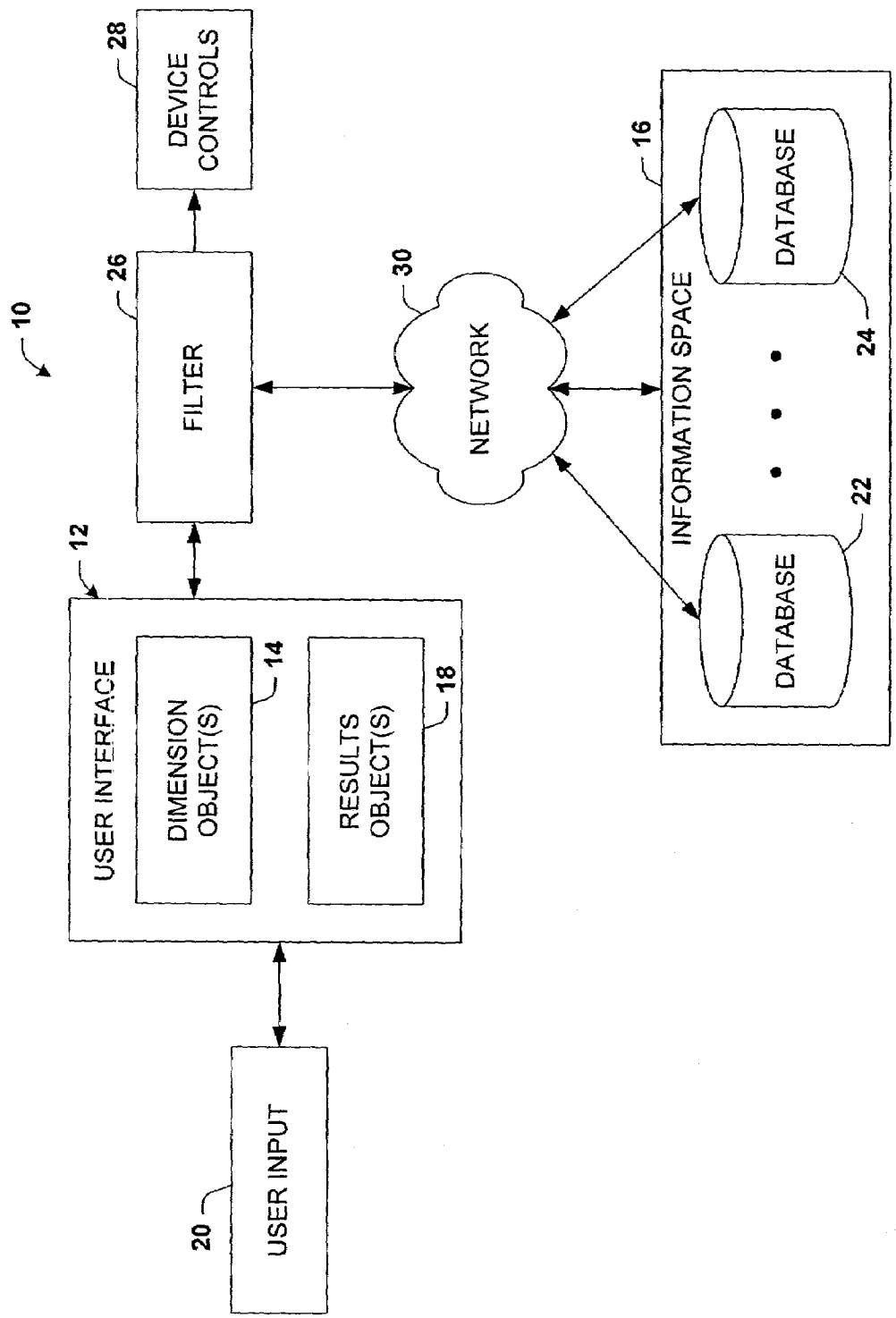
FIG. 1 is a block diagram of a system to facilitate specification of queries in accordance with an aspect of the present invention.

FIG. 1 depicts a block diagram of a general system 10 to facilitate specification of queries in accordance with an aspect of the present invention. The system 10 includes a user interface 12, such as a graphical user interface (GUI) presented on a computer monitor, PDA, television or other display for an electronic appliance. The user interface 12, for example, presents a visualization of an information taxonomy for one or more databases. The visualization, for example, includes one or more interactive dimension display objects 14, which present a hierarchical taxonomy of headings for a general information space 16 and/or commands to implement selected tasks or actions. The user interface 12 also includes one or more results objects 18 that present results of a query or command that can be implemented via the user interface. A results object 18 thus can correspond to information, to interactive display objects, which can be graphical and/or textual user interface elements, that can be selected to provide access to information as well as to controls for implementing a command based on the selected heading(s).

Each heading of a dimension object 14 further may include subheadings that correspond to a narrower subset of information in the taxonomy. The subheadings can be displayed with headings or be dynamically associated with headings in response to selecting a heading with a user input device 20. The user input device (e.g., a mouse, keyboard, touch pad, touch screen, remote-control, voice-controller, etc.) 20 is used to move a graphical object (a pointer, selection area, or cursor) on the screen relative to the graphical representation of the user interface 12. The use of headings and subheadings provides multiple levels of possible searching, which adds depth to the taxonomy represented by the user interface 12 as well as facilitates iterative searching, as described herein.

The headings associated with the dimension objects 14 correspond to search terms for the associated information space 16. For example, the information space 16, which can be formed of one or more databases 22 and 24, is decomposed and then presented as several canonical dimensions, such as Who, What, and About to name a few. As used herein, it is to be understood and appreciated that the term database can include one or more databases, directories and/or metadirectories. The dimensions as well as associated headings and subheadings can be derived from the metadata present in the information space 16. Additionally, statistical and/or algorithmic analysis of the content of the items in the database can also yield metadata corresponding to headings in the taxonomy. Commands are encapsulations of actions that can be performed over a scope of objects, such to activate devices, applications and the like. The headings and commands that form the dimension objects 16 can be determined manually by the software engineer or by statistical methods, such as from the information space and available devices and applications.

Headings and commands may also be created by any user of the interface, who can compose and insert new headings and commands as is deemed convenient. In some situations, a user-supplied heading or command might correspond to an already existing heading or command, but that is identified by a different term or combination of terms. In this case, the existing heading or command in the taxonomy can be modified to that version supplied by the user. In other situations, a user-supplied heading or command can correspond to a filter defined by one or more selected headings and commands. For example, the user can create a new heading or command within a desired dimension, which can be presented as text and/or graphics in such dimension. In this way, selection of such heading results in the user-defined filter being implemented relative to the information/command space 16. Additionally, if plural users should create a same or similar heading or command for their respective taxonomies, global changes can be implemented to the taxonomy so that a corresponding heading or command is added to the taxonomy (e.g. for all or a subset of users).

By way of particular illustration, the information space 16 can include a data polyarchy. A data polyarchy is two or more intersecting hierarchies of data. In other words, in a data polyarchy one or more data nodes in a first hierarchy are shared in various dimensions with one or more other hierarchies of data. Thus, the information space 16 can include a data manager to manage intersecting data between databases 22 and 24.

The system 10 constructs a filter 26 in response to one or more headings or commands being selected via the user input 20. Construction of the filter 26 initiates a query for information in the information space 16 and/or performance of a corresponding action. The filter 26 queries the information space 16 for information or command items that satisfy the filter. Because the filter 26 includes metadata derived from the information space 16, based on the heading(s) and/or selected commands, access and retrieval of information is facilitated. One or more results objects 18 are presented in the user interface 12 for information and commands satisfying the filter. In the particular case of a command, for example, a results object can correspond to a fully specified task associated with appropriate device controls 28 to enable activation and/or use of a corresponding device, application, and so forth. Both headings and results can be concurrently displayed to facilitate iterative, real-time information queries and implementation of tasks.

As depicted in the example of FIG. 1, the user interface 12 can operate a front end to access the information space 16 through a network 30, such as a local or wide area network. For example, the user interface 12 can be provided as search/command engine accessible over the Internet or an intranet. Alternatively or additionally, the user input device can be a remote wireless device (e.g., mobile telephone, PDA, notebook computer, etc.) that is served the user interface 12 by an associated server (not shown) through a telecommunications network 30. While the user interface 12 is illustrated as connected to the information space 16 through the network 30, it is to be understood and appreciated that the user interface also can exist remotely and be accessed via the user input device 20 through the network. In another alternative approach, the network 30 could be eliminated with the user interface 12 and information space 16 existing wholly or partially on the same machine. Thus, those skilled in the art will understand and appreciate various communication schemes that can be employed to implement a user interface and associated methodology in accordance with an aspect of the present invention.

Figure 2:
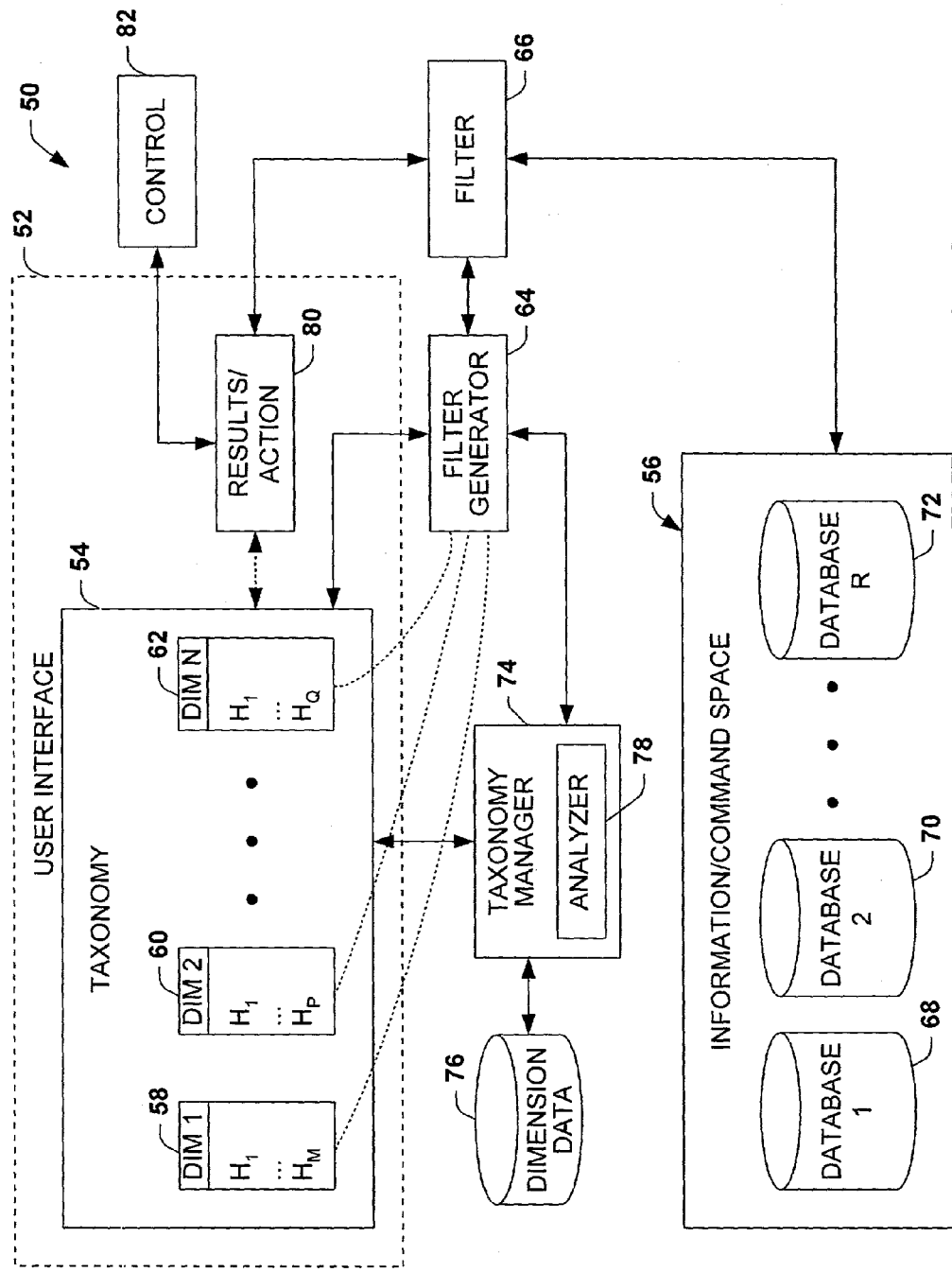
FIG. 2 is a functional block diagram of a system to facilitate specification of queries in accordance with an aspect of the present invention.

FIG. 2 illustrates another example of a system 50 to facilitate specification of a query and presentation of results in accordance with an aspect of the present invention. The system 50 includes a user interface 52 that includes an interactive classification 54 representing information/command taxonomy for an associated information/command space 56. In the example of FIG. 2, the taxonomy 54 is populated with a plurality of dimension objects 58, 60 and 62. Each of the dimension objects 58–62 corresponds to a high level canonical dimension of the information/command taxonomy. The number and composition of dimensions 58–62 generally varies according to the particular application and information space for which the user interface 52 is being utilized. The user can also select subsets of the dimensions for display.

Each of the dimensions 58–62 includes headings that delineate different high-level categories in the associated dimension. The headings can be search terms derived from metadata associated with data items in the information space, for example. Similarly, headings can correspond to commands or functions that can be performed relative to associated devices, applications or components. The headings can be provided as a tabular list of textual and/or graphical objects within the respective dimensions 58–62. The heading objects, for example, identify metadata associated with that particular dimension. Thus, command objects can be arranged as a tabular list under a command dimension, with different levels of headings and subheadings defining different levels of granularity for a particular command or function.

In accordance with an aspect of the present invention, headings, subheadings or command terms can be listed in multiple places in the information taxonomy to provide redundancy. The redundancy accounts for the belief that different users may conceive of information taxonomies in different ways. In this way, seemingly different orders of heading selections can result in identical filters. The redundant placement of search/command terms can extend across the taxonomy (e.g., the same level but in different dimensions) as well as in depth (e.g. different levels but in the same or different dimensions). By way of example, a term such as "Weather" could be provided in a top dimension (e.g., "About") as well as in a tertiary subheading under the same or a different dimension (e.g., "About/News/Local/Weather"). Additionally, if the term "Weather" had not been provided in the top dimension by the designers of the taxonomy, the user could alter her view of the taxonomy to insert it there as well as at one or more other locations deemed appropriate by the user.

The system also includes a filter generator 64 that generates a filter 66 based on a user selecting one or more headings from the available dimensions 58–62 presented in the user interface 54. For example, the filter generator 64 constructs a Boolean expression based on the selected headings, in which selections within a dimension are ORed and the selections across different dimensions are ANDed. This simplification is meant to address the problem that most users do not fully comprehend the intricacies of Boolean operators and how they combine to form expressions. Those skilled in the art will understand and appreciate other ways in which filter expressions can be constructed in accordance with an aspect of the present invention. User interaction is not impeded because the system does not require the user to specify the type of Boolean operators to be used in the query, as the dimensions from which headings and/or subheadings are selected can themselves define Boolean operators on the selected headings.

The filter 66 defines a query that is applied to the information space 56, which can include one or more databases 68, 70 and 72. The databases 68–72 can be implemented in one or more servers. The particular manner in which data is stored in the databases 68–72 can vary depending, for example, the type of information and manner in which the information is collected. A database manager (not shown) also can be associated with the respective databases 68–72 to apply the query and retrieve information satisfying the query from the respective databases. Due to the possible disparate nature of the databases 68–72, the system 50 can be implemented in conjunction with a meta-directory service, intermediary content index, or other type of network database system to facilitate retrieval of desired information and performance of associated commands.

In order to facilitate presentation and modifications of the dimensions 58–62 provided in the user interface 52, the system also can include a taxonomy manager 74, such as service or database. The taxonomy manager 74, for example, includes or has access to dimension data 76, which stores the headings and commands representing dimensions for the taxonomy. The dimension data 76 can be stored in a meta-directory separately from the information/command space 56 or, alternatively, it can be stored as part of the information space.

To help improve the taxonomy, the taxonomy manager can employ an analyzer 78 to adjust the taxonomy for one or more users. The analyzer 78, for example, is programmed to monitor user selections and/or user modifications to assignable metadata. In response to the monitored properties, the analyzer can algorithmically determine what changes, if any, should be implemented relative to the taxonomy. Such changes can be applied globally so that the taxonomy for all user interfaces reflects the change or so that the taxonomy for a selected subset of one or more user interfaces is altered accordingly (e.g. based on a user profile, taxonomy usage, or other characteristics).

It is still further to be appreciated that, as mentioned above, the taxonomy manager 74 can implement taxonomical changes individually for each user, so as to provide a customized presentation of the taxonomy for each user. In order to enable customized interfaces for plural users, selected of the dimension data 76 further can be linked with respective users or to subsets of users (e.g., through a user ID, a cookie or other identifying information). As a result, the taxonomy manager 74 can populate respective user interfaces 52 with corresponding headings and commands, including changes and additions made by respective users. For example, the individual changes can correspond to adding a new heading or command (e.g., corresponding to a predefined filter) as well as to deleting or otherwise modifying existing headings relative to the visualization or the taxonomy for that user.

Information and/or commands satisfying the filter are returned as one or more results/action objects 80 in the user interface 52, such as in an associated part (e.g., a window or pane) of the interface. The results/action object 80 presents an indication of results from the information/command space that satisfy the filter 66. The results can be displayed as textual, graphical and/or audible objects associated with the user interface 52 (e.g., as a tabular list). After selecting one or more items in the results object 80, the user can issue a command to refine the filter 66, such as based on the selected items or other inputs (e.g., selecting or deselecting other headings or subheadings) to refine the filter. As an alternative, the results from a query can be displayed integrated with the search terms, interleaved with the headings and sub-headings.

The results presented by the results object 80, for example, can be organized or sorted based on which dimension(s) and headings are selected. For example, organizing the results based on the "Place" dimension could cause the result items to be presented superimposed on a geographic map. For example, selecting the title for a particular dimension sorts the contents of the results so that the metadata within the selected dimension(s) is employed as the primary sort. The results object 80 also can present results of an associated query divided into several regions that display additional information, such as to show multiple levels of relevancy for the query. For example, one region can display results that exactly match the query, another region for items deemed as related to the current results, and a third region for items that are deemed by a service-provider or data-provider as being particularly relevant to the user given the general scope of the current filter.

As with common interfaces front-ends to operating systems such as file viewers, successive selection of different dimension headings can be used to easily specify nested sorts. For example, clicking on the heading for the "Size" dimension would cause the results items to be sorted via their size in the file-system. Subsequently clicking on the "Date" heading would cause the primary sort of the results items to be "creation-date." A secondary sort based on file-size would still be maintained.

By way of illustration, a user is initially presented with several columns of filter criteria, such as in which each column corresponds to one of the canonical dimensions 58–68. With each selection of a heading, the filter generator 64 constructs a corresponding filter, which causes a separate results/action display object to be populated with items from the information space 56 that satisfy the new current filter. If the user wishes to narrow their search, the user can expand a particular heading to reveal more specific filter criteria, such as subheadings associated with the expanded heading. Thus, a selection from this finer-grain list narrows the results of the query. If too few items are shown in the results object 80, the user also can deselect filters or select broader headings, thereby broadening the query. Those skilled in the art will understand and appreciate that more complex filters can be constructed by choosing multiple headings and commands from multiple dimensions 58–60 and multiple levels. Additionally, or alternatively, the user can enter free-text query that can be converted to the filter and visualized to the user by selecting corresponding headings and subheadings in the user interface 52. A user can select one or more items displayed with the results object 80 to obtain additional information associated with the displayed results or edit the selected item.

For example, the system 50 can present a user with information about relationships between different results items in the results object 80. The relationships can be determined as a function of metadata associated with the related results items. The relationships can be determined explicitly, such as when certain metadata of a results item matches metadata in another results item or when content that has been indexed from multiple items is judged by the system to be similar. Alternatively or additionally, a relationship can be determined implicitly, such as based on an evaluation of other metadata indicating a likely relationship. An implicit relationship can be identified by populating associated metadata (e.g., tagging the data object) with information that indicates that the data object has a particular characteristic. Thus, those results items having metadata indicative of the particular characteristic will be considered related in the common characteristic. Implicitly derived metadata can also come from statistical analysis of the content of the items in the database(s) 68–72, whether the items be textual, image, audio, or of another content type. The content analysis can be implemented, for example, in one or more servers (e.g., a metadirectory or polyarchy server) or within the user interface itself, such that the results are utilized in the user interface 52 to enable presentation of pertinent relationships.

By way of illustration, the metadata can correspond to one or more of three general categories of information. The metadata can be generated by at the associated server or by one or more services running in conjunction with the databases 68–72, such as at one more other services. In one aspect, the metadata can include system information, which is generally tied to characteristics of respective items in the database (e.g., indexed content, including, size, type, creation date, author, etc.). Another category of metadata includes user-created information, such as "subject", preference, priority, genre, to name a few. A third category corresponds to metadata derived from content of the database items. This type of metadata, for example, can come from statistical or other algorithmic analysis of the actual content of items in the database. If a sophisticated enough image recognition technology existed, a semantic tag (e.g., metadata) could be assigned by the system 50 to identify what is in the image ("horse", "child", etc). Those skilled in the art will understand and appreciate that, as new algorithms are discovered, the metadata can be created in new ways, perhaps even in real-time from arbitrary content, thereby enabling searching across any information store, even those that are not structured databases.

When a filter 66 is constructed to implement a command, the results/action object 80 may present controls 82 to the user for implementing the command. Thus, the user interface 52 can provide a command interface to issue a wide range of commands to linked applications and devices. In this kind of configuration, the user interface 52 becomes a domain-specific task-based user-interface where items presented in the results object 80 can correspond to fully specified tasks. As a command interface, the headings in each command dimension enable the user to iteratively search through the command and task space, which can include multiple levels. This is in contrast to ways that users find commands in a typical application (e.g., either by looking through a set of fixed menus or by searching in a linked help system). By composing the command space into a taxonomy that presents dynamically generated tasks, locating and implementing tasks is facilitated in accordance with an aspect of the present invention.

For example, if the command is to operate an associated electronic appliance, the controls can provide the user with appropriate options, which may include interactive textual and/or graphical display objects, for implementing at least the selected function of the appliance. Alternatively or additionally, the command selection can activate an associated application or user interface based on the selected command heading(s). Those skilled in the art will understand and appreciated various ways in which controls for associated applications and devices can be implemented via the user interface 52, all of which are contemplated as falling within the scope of the present invention.

Thus, according to an aspect of the present invention, it is to be appreciated that the user interface 52 can provide a command interface only, a query specification interface only, or a combination information and command interface.

Figure 3:
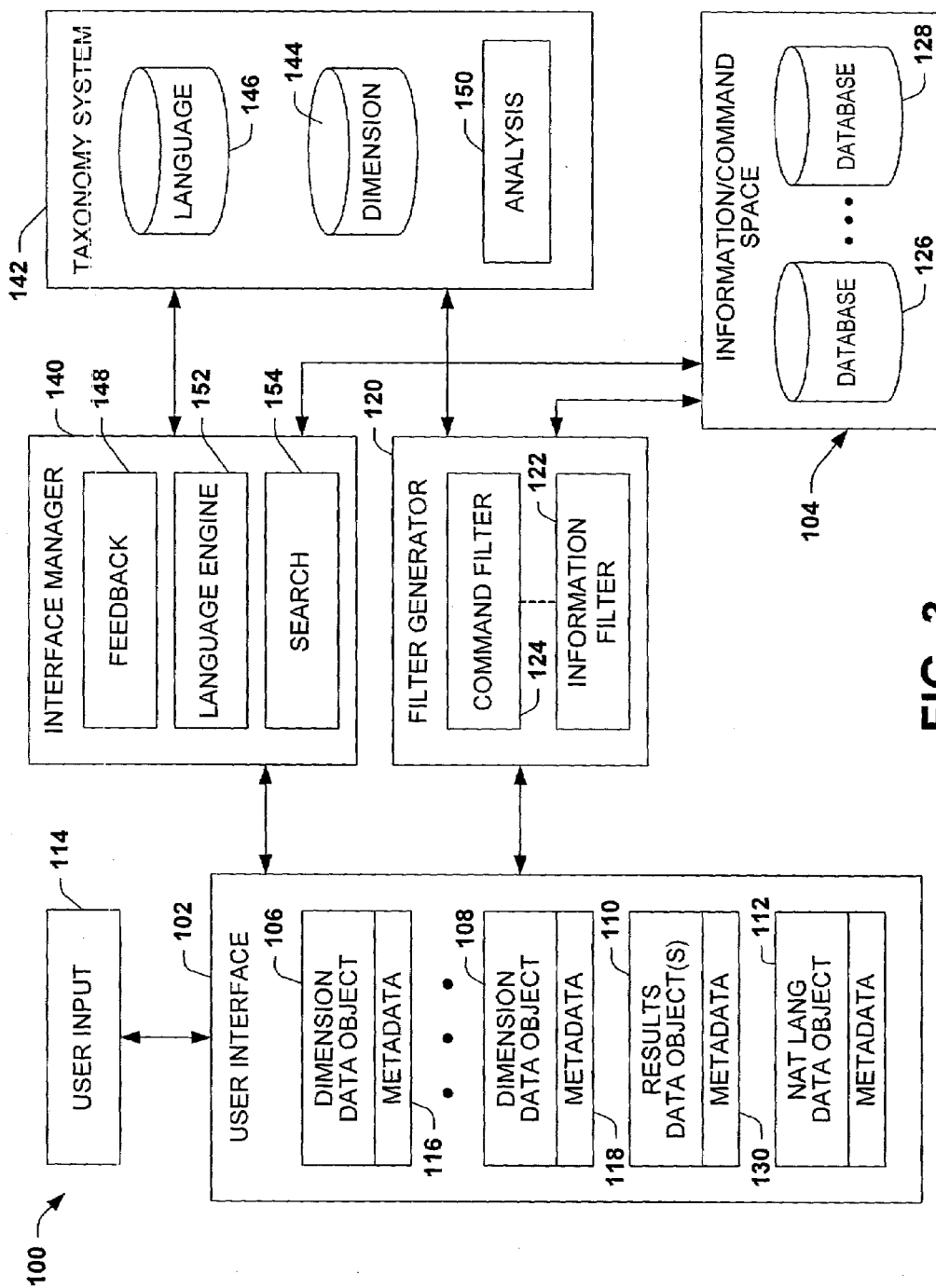
FIG. 3 is an example of a system that can be implemented to facilitate specification of queries in accordance with an aspect of the present invention.

FIG. 3 is an example of a system 100 that can be implemented to facilitate specification of queries, such as for a command and/or information interface, in accordance with an aspect of the present invention. The system 100 includes a graphical user interface (GUI) 102 that presents an interactive taxonomy programmed and/or configured according to an information and/or command-task space 104 for which the system is being implemented. The GUI 102 includes a plurality of display data objects 106, 108, 110, and 112, which can be programmed to present information to a user, such as in the form of graphical, textual and/or audible objects. The objects 106–112 also can be interactive objects programmed to receive information, such as user information provided as a user input 114. The user input data can correspond to inputs provided by any type of user input device, including, for example, a pointing device (e.g. mouse, touch screen, touch pad, etc.), a keyboard, keypad, a speech processor, to name a few. The user input 114 operates on the data objects 106–112, such as to select attributes and/or associated parameters.

In the example of FIG. 3, the user interface 102 is depicted as including dimension data objects 106 and 108, which correspond to high-level canonical dimensions in the information/command taxonomy. For example, high level information dimensions for dimension objects 106, 108 might include ABOUT, WHERE, WHO and COMMAND, where the COMMAND dimension corresponds to at least part of a command interface.

The dimension objects 106 and 108 also include a variety of respective metadata 116 and 118, which can be derived from metadata associated with data items in the information space 104. The dimension objects 106 and 108 include headings (not shown) that are terms or objects that visually represent the metadata 116 and 118, respectively, in the GUI 102. The headings define categories of subject matter that, in turn, usually contain sub-categories or subheadings. Headings, for example, correspond to query terms that are aggregated to form a filter, which is used by an associated database or search engine or directory service to search through the information/command space 104. Headings can also include commands that correspond to operating instructions that can be issued by the user to applications running on the computer or other devices that are connected to the computer or other appliance running the user interface 102. Commands are typically segregated into one dimension object of the user interface, although could be provided in different dimension objects and within different subcategories. The headings can be selected by information scientists based on common usage and conventions in the particular field for the interface 102. Taxonomies can also be created manually or by statistical methods. The manual approach is appropriate if the information space is easily understood by the general set of its users.

An example would be a taxonomy for news items. Most users would understand a classification system for News items that include the categories: "Local", "International", "Weather", "Sports", "Business", "Lifestyles", and "Business." Users are familiar with this kind of categorization from common media such as Newspapers and News websites. The category of "Weather" could then be further divided into "Local", "Regional", "Storms", and "General Information." To mitigate errors associated with composing the hierarchy of headings in connection with a large information spaces, a hierarchy of headings can be dynamically created via statistical analysis of the distribution of attributes values. Additionally, particular headings may be populated in multiple places (e.g., to provide redundancy in different dimensions and/or different levels within one or more dimensions), as different users may think of information taxonomies in different ways.

After the initial specification of headings and subheadings for a given taxonomy, as represented in dimension objects 106 and 108, headings can be ordered by several methods, including alphabetical, frequency of use, inherent ordering of continuous values, effectiveness as defined by the aforementioned statistical methods, or direct user re-ordering to suit personal preference. The user or taxonomy creator further can reduce clutter and initial complexity by choosing to only show a subset of the headings at the start. At any time, a user can then customize the presentation by revealing hidden headings or reordering the headings in a given dimension 106, 108. Such customization, for example, might alter the metadata that drives the displayed dimensions, as well as the structure of the underlying taxonomy. The customization can be employed to modify the taxonomy for a given user or, more broadly, relative for a subset of some or all users.

A filter generator 120 generates a corresponding filter 122 and/or 124 in response to the user input 114 selecting one or more headings within the dimension objects 106 and 108. The filter generator 120 can construct an expression as a function of the selected heading or headings. For example, the filter generator 120 can create a Boolean expression that combines search terms for the selected headings by corresponding logical operators (e.g., AND, OR, NOT) to provide a corresponding Boolean expression for the selected headings. By way of illustration, selected headings or commands within a dimension or column can be ORed with groups of headings between columns being ANDed together. It is to be understood and appreciated that other types of operators (e.g., mathematical or relational) also could be employed by the filter generator 120 to construct a filter according to an aspect of the present invention.

The filter 122, 124 is used as a sort within the information space 104 to provide results that satisfy the filter as the results data object 110 in the user interface 102. For example, a database manager or metadirectory service (not shown) can implement the sort relative to plural databases 126 and 128 in the information space 104. Alternatively or additionally, a database engine of each database 126, 128 can employ the filter 122, 124 to locate data items within the respective database that satisfy the filter. The results object 110 provides an interactive display object in the user interface 102 having associated metadata 130. The filter generator 120 can employ the metadata 130 to refine the current filter 122, 124 based on the user input 114 indicating a selection of part of one or more display items in the results object 110. A current filter also can be modified iteratively by the user based on the user input 114 selecting or deselecting one or more headings (at different degrees of specificity) associated with a dimension object 106, 108.

In the example of FIG. 3 the filter 122 is an information filter and filter 124 is a command filter. The information filter 122 generally is constructed based on an aggregation of one or more headings that correspond to search terms for the information space 104. The command filter 124 is constructed from one or more headings associated with performing tasks relative to, for example, an associated application or a device. A dashed line interconnecting the filters 122 and 124 represents a hybrid filter that includes characteristics from both types of filters. Depending on, for example, the terms in the filter 122, 124 and/or the type of filter, the filter can be selectively applied to the databases 126–128 of the information/command space 104 to obtain and present the user with corresponding results at 110.

The system 100 also includes an interface manager 140 programmed to control the various attributes of the user interface 102 according to an aspect of the present invention. The interface manager 140, which can be implemented as a service at one or more servers or within the user interface, employs an associated taxonomy system 142 that controls what information is to be presented in the user interface 102. For example, the taxonomy system 142 includes a taxonomy service, such as implemented at one or more servers. The taxonomy system 142 includes a dimension data system (e.g., a database or directory) 144 that defines the information/command taxonomy, including that represented in the GUI 102. The dimension data system 144 includes available headings, subheadings and commands and their relationships for use in the taxonomy represented in the GUI 102. It is to be understood that the dimension data system 144 also can be modified to customize the taxonomy for individual user interfaces and/or for subsets of plural user interfaces. The taxonomy system 142 also can include a language database 146 that stores information about the language and terms (including synonyms) that can be selected for generating a filter according to an aspect of the present invention. It is to be understood and appreciated that the language database 146 could be implemented as part of the dimension data system 144 or in conjunction with a separate service associated with a natural language engine, as described below.

The interface manager 140 includes a feedback component 148 programmed to implement feedback relative to the user interface 102 based on user inputs 114. The feedback component 148 can present a list of subheadings in response to selecting a particular heading. Additionally, the feedback component 148 can provide predictive feedback at the user interface 102. The predictive feedback can provide a textual, graphical and/or audible indication, for example, of how many results and/or in which headings or subheadings results are distributed. Additionally or alternatively, feedback can be aggregated from multiple users or over time from one or more users so that the metadata employed to derive the displayed dimensions can mature as a function of use.

By way of illustration, the feedback component 148 can be associated an analysis component 150 of the taxonomy system 142. The analysis component 150 can be programmed to monitor selections and/or modifications provided by one or more user interfaces 102. The modifications, for example, can include user-assignable metadata, such as headings presented in the user interface as well as non-inherent attributes of stored data. The analysis component 150 can employ such selections and modifications to discern (e.g., based on an algorithm or statistically) whether to modify the taxonomy for a given user interface or for a subset of user interfaces. The analysis component 150 operates on the dimension data system 144 to implement appropriate modifications to the taxonomy for one or more user interfaces based on the monitored selections and/or modifications. The changes can be applied globally so that the taxonomy for all user interfaces reflects the change or so that the taxonomy for a selected subset of one or more user interfaces is altered accordingly (e.g. based on a user profile, taxonomy usage, or other characteristics). The analysis component 150 can be implemented as a service residing in one or more servers. The feedback component 148 thus can implement taxonomy modifications dynamically (e.g., in real time), including user-specific and/or global modifications, based on changes made to the dimension data system 144.

By way of illustration, with a single filter selection, thousands of results can be returned or possibly none. To provide users a better understanding of what the consequences of selecting particular headings, the feedback component 148 can associate numerical and/or graphical real-time visual feedback cues with corresponding headings of dimension objects 106 and 108 to show magnitude of impending prospective filters. For example, when the user hovers a graphical input object (e.g., a pointer or tentative selection area as used in remote-control interfaces) over an unselected (prospective filter) or selected heading, a tool-tip or equivalent cue can be presented in the user interface 102 to inform the user how many items will be presented in the results if such heading or subheading is selected to modify the current filter.

Additionally, results items currently in the results object 110 that will be removed upon selecting or deselecting the heading under the mouse can be visually diminished without fully hiding. This feature can be implemented by processing the prospective new query and comparing the results of the prospective query together with the current results. The server has to calculate the difference between the two queries and then return the local identifiers of those items that are removed. If the dataset is large, this feature may require significant processing power. Accordingly, it may be desirable to allow the user to selectively enable and disable this feature, such as by providing an appropriate user input 114.

The interface engine also includes a language engine 152 programmed to implement linguistic features associated with the user interface 102. The language engine 152, for example, can include a natural language engine operative to convert a filter into a natural language textual representation (e.g., a sentence) and/or convert a natural language sentence into a corresponding filter, which can be employed to select corresponding headings and/or subheadings in the user interface 102. The language engine 152 also can access language database 146 to ascertain synonyms relative to various headings.

By way of illustration, the language engine 152 can implement automatic filter-term generation, such as by identifying different parts of speech from one or more selected headings and commands. Additionally or alternatively, the language engine 152 can populate the natural language data object 112 of the user interface 102 to provide Natural language full-sentence feedback. For example, a user new to a particular information taxonomy, such as represented in the user interface 102 of the system 100, may at first not understand what is happening when multiple headings are selected, both from within one dimension 106 or 108 and across multiple dimensions. The natural language portion of the language engine 152 can generate, in real-time, a full-sentence version of the current filter (constructed from the selected headings and commands) and present that to the user. This helps the user implicitly understand the operators and terms that are being used in the current filter.

Another aspect of the present invention enables a user to freely input searches (as voice or text user input data), which are provided to the language engine 152. The language engine 152, in turn, accesses the language database 146 and converts the user input 114 to a form commensurate with the headings and commands in the current taxonomy. Terms that are not resolvable can be flagged (e.g., by highlighting) or otherwise identified, indicating to the user to either modify the term or make a corresponding heading selection in the GUI 102. Until the user selects enough headings to disambiguate the interpretation of the free-text, the current filter 122, 124 incompletely represents the user's intended query. The system uses as much of the interpreted filter as possible to generate a set of result items. While the filter is in an incomplete state, the results in the results object 110 of the GUI 102 may show all relevant results, such as ranked by relevance. This both helps the user to refine their intention with the current filter and provides serendipitous results that facilitate associative browsing. In addition, the user also can employ results at this (or another) stage to create a new heading or subheading for use in connection with a convenient dimension desired by the user. The changes to the taxonomy can be implemented by modifying dynamic metadata stored in the data system 144 associated with one or more dimensions of the user interface 102.

The language engine 152 also can generate synonyms dynamically in accordance with an aspect of the present invention. In response to an appropriate request via the user input 114, the language engine 152 can retrieve one or more synonyms from the language database 146. The database 146 contains synonyms for the headings of the associated taxonomy. The synonym generation can be based on heuristics or created by the creator of the information taxonomy.

By way of example, if a user cannot find a desired heading or command in the currently visible portion of the taxonomy, the user can issue a search over the set of commands and headings. The search can be initiated by entering a term as the user input 114 to the GUI 102 or by appropriately selecting a term displayed in the existing taxonomy. An internal search engine 154 associated with the language engine 152 can search both the existing headings and commands in the taxonomy system 142 and synonyms for existing terms. The scope of the search can be within a particular column or across all the columns. Matches can be presented in the GUI 102 with a degree of relevance. The user can then choose whether to use the existing term in the taxonomy or customize the interface 102 (either entered as a user input or selected from a list of possible synonyms), so as to populate the taxonomy with terms that are familiar to the user.

As mentioned above, the system 100 can be employed as a command interface to issue a wide range of commands to linked applications and devices. In such a taxonomy, one or more dimension objects 106, 108 contain terms that can be selectively combined to generate the command filter 122 so as to provide the user with a fully specified task, which is presented as a results item in the results object 110. Thus, a user simply needs to select a corresponding results item to perform a corresponding task. Those skilled in the art will understand and appreciate that one or more dimensions can be configured to facilitate implementing specific tasks, such as operating a home-based appliance or performing word processing.

By way of further illustration, the GUI 102 can be utilized as an electronic program guide to facilitate viewing or recording of audio and/or visual programming. For example, available audio and/or visual programming data for respective programs may include metadata identifying a title, description, duration, rating, stars or hosts, broadcast date and time, genre or category of program, etc. Thus, by selecting appropriate headings from the GUI 102, corresponding information may be organized and presented as results items in the corresponding results pane. Various headings and subheadings of the GUI 102 may, in turn, be selected by user inputs 114 to implement commands or obtain information relative to desired programming (e.g., play or record a program, or obtain additional information about a particular program).

The foregoing and other features and characteristics will be better appreciated with respect to FIGS. 4–43. FIGS. 4–43 illustrate specific examples of various types of information and/or command interfaces and results that can be implemented in accordance with an aspect of the present invention. It is to be understood and appreciated that the functionality associated with these figures can be implemented as computer-executable instructions, such as program modules or processes, executed by one or more computers or other devices. Generally, program modules include routines, programs, objects, components, data structures, etc. that perform particular tasks or implement particular abstract data types. Typically the functionality of the program modules may be combined or distributed as desired.

For purposes of continuity and simplicity of explanation, identical reference numbers have been used throughout FIGS. 4–33 to indicate both identical and similar components and features. It will be understood and appreciated that the features depicted in these figures are merely illustrative of some possible examples of interfaces and associated features and functionality that can be implemented according to various aspects of the present invention and, as such, are by no means intended to limit the subject matter set forth in the appended claims.

FIG. 4 depicts an example of user interface 200 that includes a plurality of columns 202, 204, 206, 208, 210, 212, 214 and 216 that contain headings, which can be selected to generate filter criteria in accordance with an aspect of the present invention. Each column 202–216 represents one canonical dimension of an associated taxonomy. In this example, the canonical dimensions 202–216 correspond to DO, WHO, SUBJECT, PROPERTY, WHEN, TYPE, DEVICE, and WHERE. The dimension 202 is part of a command interface that includes various commands that can be selected to perform a task, such as relative to one or more of the devices or applications associated with the dimension 214.

Figure 6:
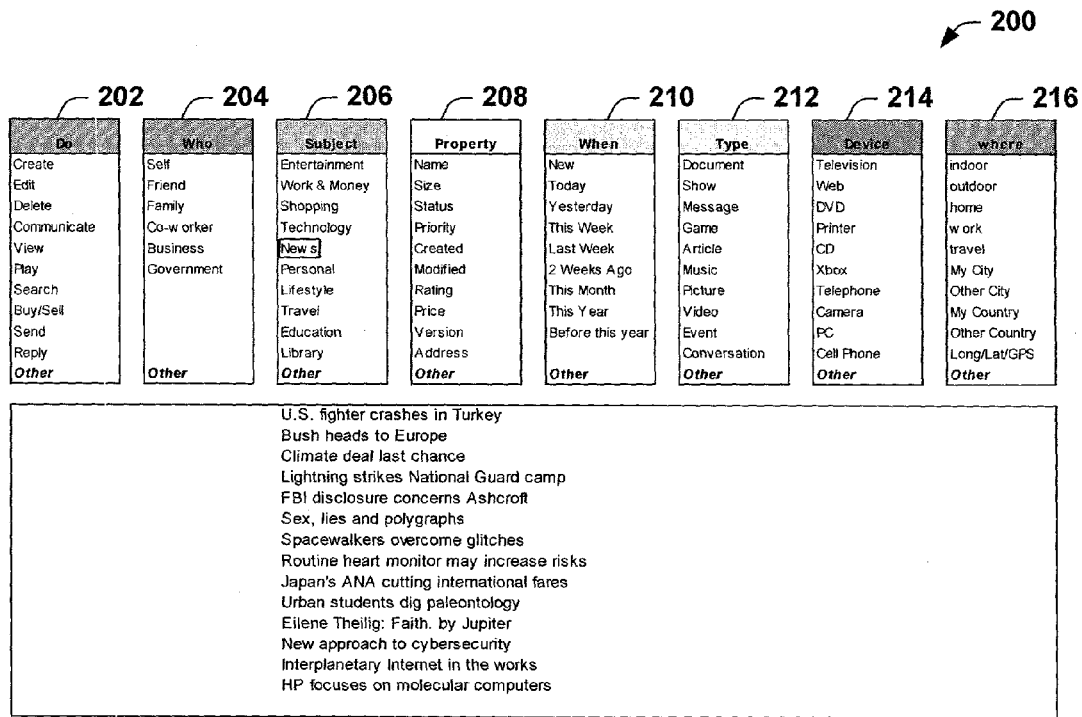
FIG. 6 is an example of a user interface displaying results for a selected heading in accordance with an aspect of the present invention.

The user can select headings or subheadings from as many columns as they are interested in, such as to generate a corresponding filter according to the selections. For example, in FIG. 5, a pointer 220 is being employed to select a heading NEWS from the dimension 206 entitled SUBJECT. With each selection, a results pane is populated with items from one or more databases in the information/command space that satisfy the current filter, as defined by the selected heading(s) of the displayed taxonomy. Thus, as shown in FIG. 6, a list of related news items can be presented in a results pane 222 in response to selecting the NEWS heading from the SUBJECT dimension 206. Due to likely limited space in the results pane 222, the results satisfying the selected heading can be arranged in an order according to their relevance to the filter or based on other sorting parameters, which can be user-selected.

By way of illustration, there are two general ways to populate a results pane 222 with information when no selections have been made (e.g., a default state). In a first example, when no filters are selected, no items are displayed in an associated results pane. As soon as a heading or subheading is selected, all of the items in the database are displayed except those that do not satisfy the current filter. In a second example, when no filters are selected, all of the items in the database can be shown in the results pane. Selecting any filters will then reduce the number of results items in order to satisfy the current filter.

Figure 7:
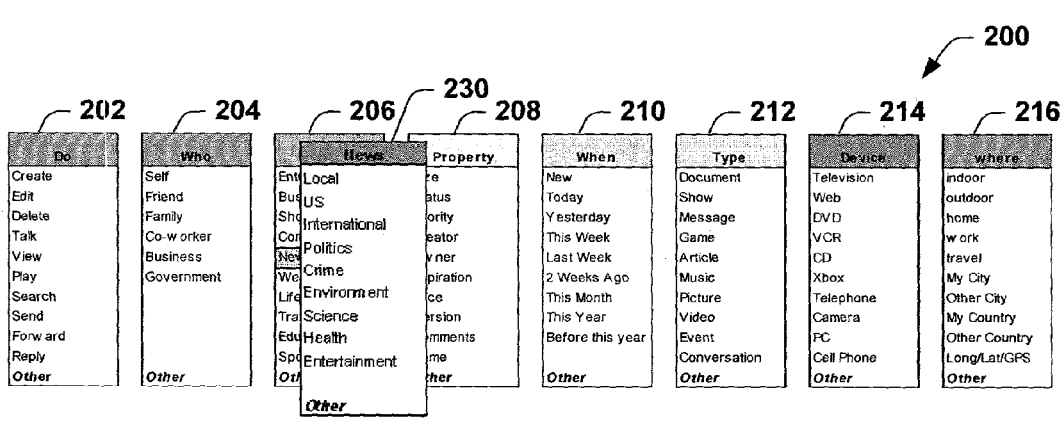
FIG. 7 is an example of a user interface displaying a hierarchical classification for a selected heading in accordance with an aspect of the present invention.

As described herein, a heading may itself be a selectable high-level filter, or the heading may be used to access more specific criterion. Thus, if the user wishes to narrow the search under a particular heading, the user can expand the heading to reveal more specific filter criteria (e.g., subheadings or categories) related to the selected heading. FIG. 7 depicts an example of a NEWS display object 230, which can be dynamically presented on the GUI 200 by expanding the NEWS heading of the SUBJECT dimension 206. Thus, the NEWS display object 230 includes some possible subheadings that can be provided under the NEWS heading of the subject column 206.

By way of illustration, if a user has selected a heading object, such as the NEWS heading 230 from the SUBJECT dimension 206, the heading can be expanded to show its subheadings for the current taxonomy. In response to the user selecting one of its displayed subheadings (e.g., WEATHER), several things occur in the user interface 200. For example, the broad heading NEWS is deselected and the filter becomes narrower, such that only items that apply to weather are displayed. A visual cue also can be displayed in or next to the NEWS heading to indicate that one of the NEWS subheadings has been selected. Thus, clicking on a subheading substantially narrows a filter.

As described herein, more complex filters can be constructed by choosing multiple headings and/or commands from multiple dimensions and at different levels of granularity. For example, where a current filter is being implemented (e.g., one or more selected headings), an intermediate filter (e.g., broader) can be dynamically created in response to a user selecting one or more additional subheadings under a particular heading and/or several headings under a given dimension.

As a user selects headings or subheadings (e.g., query terms) from the taxonomy, real-time full-text feedback can be provided by a natural language generation system. In general, certain types of users are not very facile at constructing (or understanding already constructed) complex queries, such as Boolean statements. To help educate these and other users, the GUI system, according to an aspect of the present invention, enforces a particular configuration of Boolean expressions, such as by OR'ing selections within a dimension and AND'ing the selections across different dimensions. This further helps reinforce for the user how the provided columns and commands are used by the GUI system. The sentence construction disambiguates the relationship amongst the terms selected in the current filter and helps show the inherent Boolean structure of the query.

Given, though, the general confusion that many users have with Boolean terms and the construction of Boolean statements, the good means of indicating the nature of a Boolean composition is by providing very quick response in retrieving results to satisfy the current filter. As a user selects and deselects particular headings and subheadings, the user will implicitly perceive what kind of Boolean is being used. If an AND is being used, fewer results will appear with each successive selection of a heading or subheading. If OR is being used, more results will appear with each successive selection of a heading or subheading.

Figure 8:
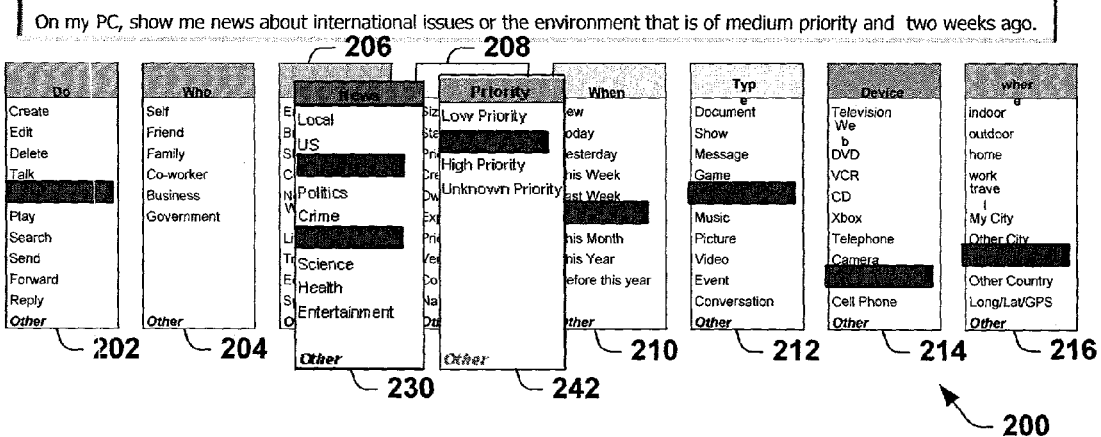
FIG. 8 is an example of a user interface displaying a natural language representation of filter being implemented in accordance with an aspect of the present invention.

FIG. 8 illustrates an example of the GUI 200 implementing a complex filter and providing full-sentence feedback in a natural language display object 240 presented as part of the GUI. The text depicted in the display object 240 corresponds to the filter defined by a combination of selected headings and subheadings: one heading is selected from the DO dimension 202; two subheadings are selected from the NEWS display object 230; one subheading is selected from a PRIORITY display object 242 of the PROPERTY dimension 208; and one heading is selected from each of the remaining dimensions 210–216. In particular, the selections in the GUI 200 resolve to: "On my PC, show me news about international issues OR the environment that is of medium priority AND two weeks ago."

Figure 9:
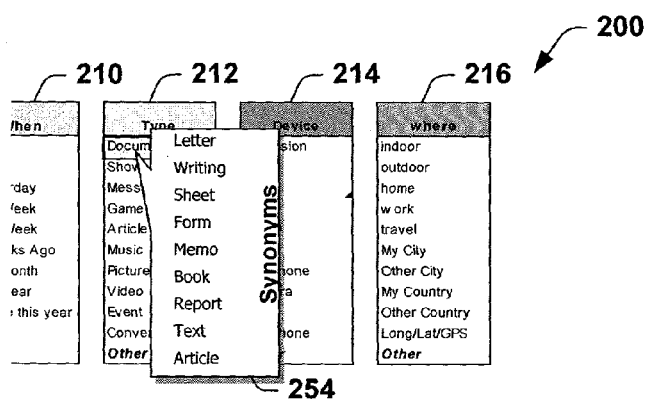
FIG. 9 is an example of part of a user interface displaying synonyms for a selected heading in accordance with an aspect of the present invention.

Because users may not always conceive of an information space in the same way as the initial taxonomy is presented, the GUI system can, upon request, provide synonyms for words that are used in the headings and commands. FIG. 9 illustrates an example of part of the GUI 200, showing how a user may obtain synonyms in accordance with an aspect of the present invention. In particular, the user has selected a DOCUMENT heading from a TYPE dimension 252. The synonyms for the DOCUMENT heading are presented in a dialog box 254 depicted as emanating from the selected heading.

The synonym dialog box 254, for example, can be activated by right-clicking with a pointing device or hovering over the heading or subheading for at least a predetermined period of time. In this situation, the synonyms are provided mainly to educate the user as to the types of information or commands that are within the scope of the heading. Additionally, a user can select one of the terms in the synonym to modify the taxonomy accordingly. In this way, the user can customize the taxonomy to present terms more familiar to the user than the initially provided headings and commands of the taxonomy. Those skilled in the art will understand and appreciate various display formats that could be used to provide a list of possible synonyms.

As described above, there may be instances when a user cannot find a desired term listed explicitly in any of the dimensions or in any of the provided synonyms. The user can issue a search over the set of commands and headings of the current taxonomy. An internal search engine searches both the existing headings and commands in the taxonomy and synonyms for the existing terms. The scope of the search can be within a particular column or across all the columns.

Figure 10A:
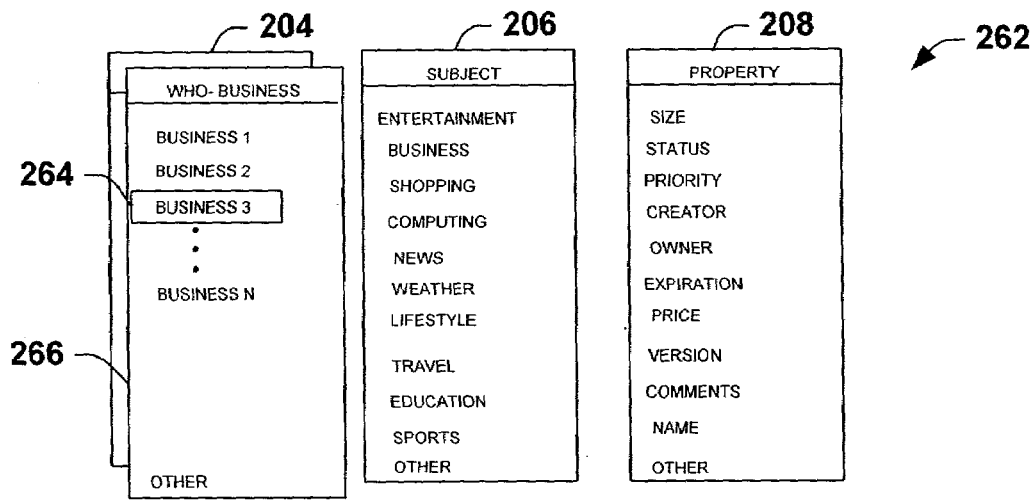
FIGS. 10A–10D illustrate an example of finding a synonym in a dimension of a user interface in accordance with an aspect of the present invention.
Figure 10B:
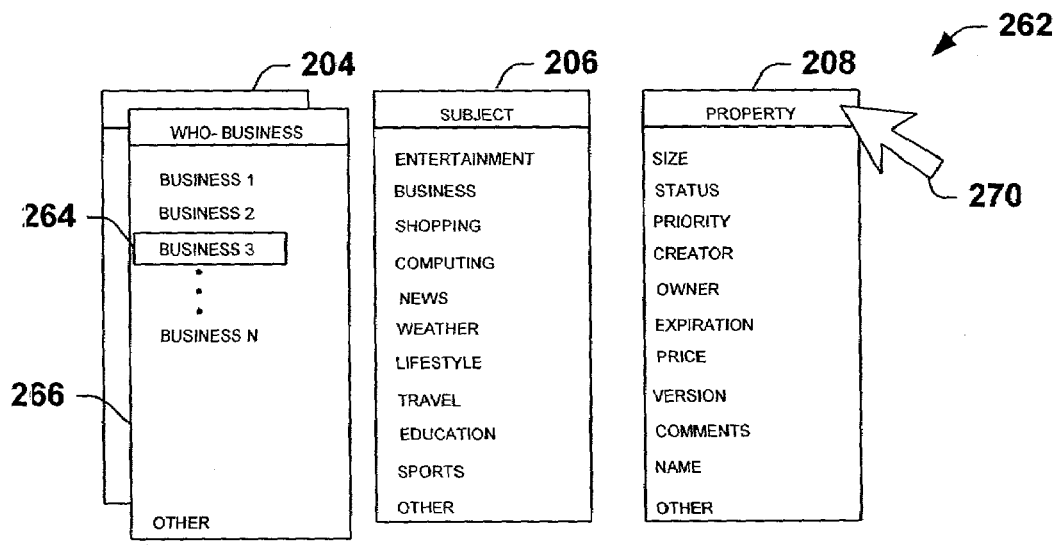
Figure 10C:
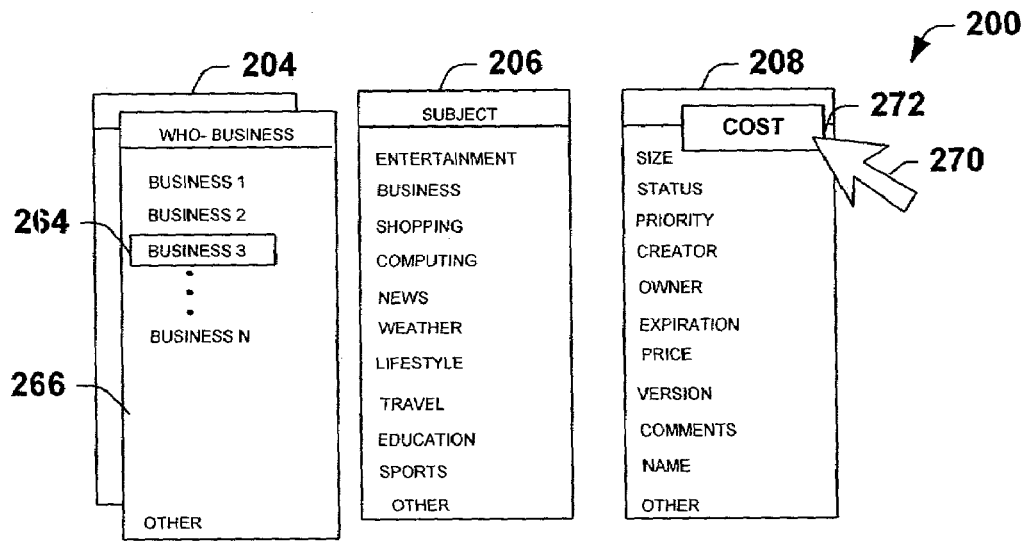
Figure 10D:
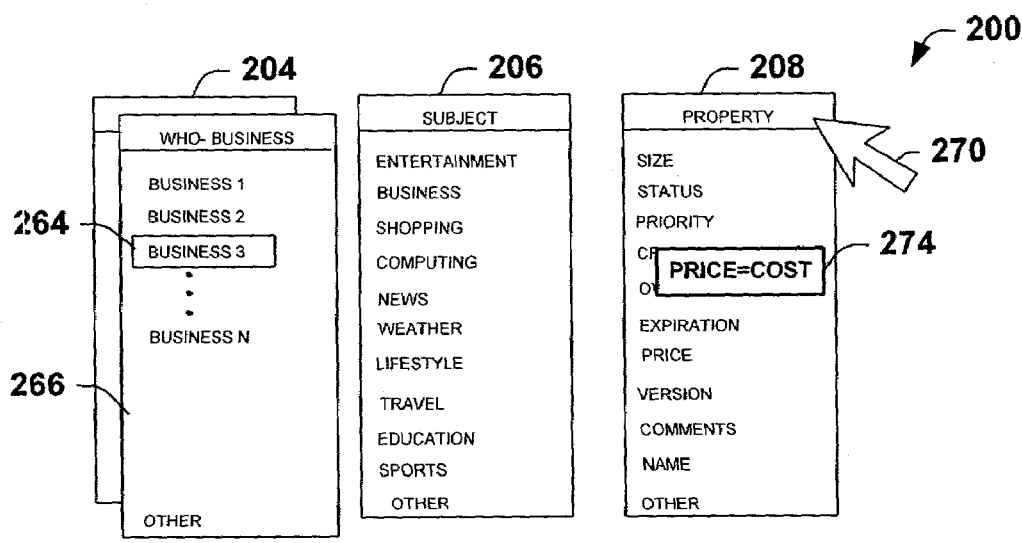

FIGS. 10A–10D illustrate an example of a methodology that can be utilized by the user to search for and obtain an appropriate synonym in a single dimension or column 204 of the GUI 200 according to an aspect of the present invention. In this example, the user desires a synonym for the term "COST", which is not shown in the visible portion of the GUI 200. The user has expanded the heading BUSINESS from the WHO column 204 of the GUI 200 and selected a business name (e.g., BUSINESS 3 indicated at 264) from a list of names in a WHO-BUSINESS display object 266 of the GUI (FIG. 10A). Next, as depicted in FIG. 10B, the user selects the heading of a PROPERTY dimension 208, such as with a graphical pointer 270 represented in the GUI 200. This causes an input dialog box 270 to appear on the GUI 200 (FIG. 10C), prompting the user for the search term. The user has entered the term "COST". Then, as shown in FIG. 10D, the search engine for the GUI returns a synonym dialog box 274 indicating that the term "PRICE" is equivalent to "COST", which is listed in the property dimension 208.

Figure 11A:
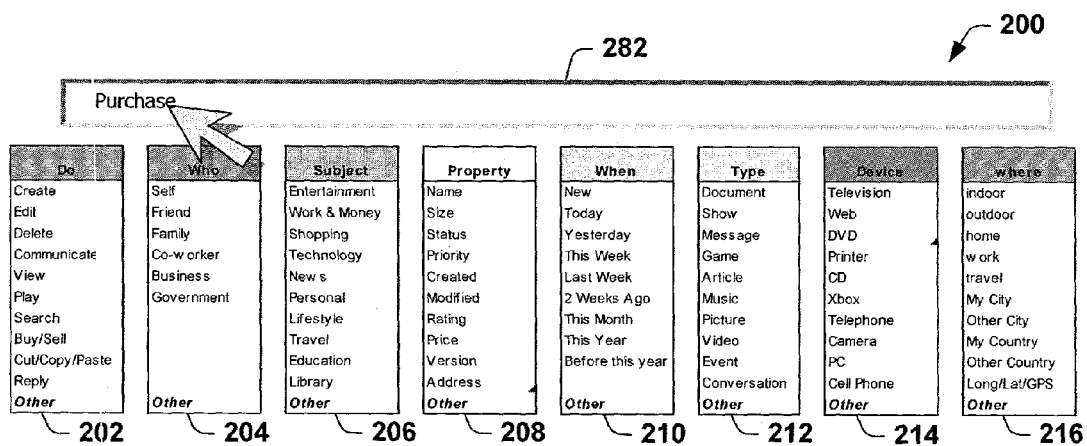
FIGS. 11A–11B show an example of a sequence that can be used for synonym searching across multiple columns in accordance with an aspect of the present invention.
Figure 11B:
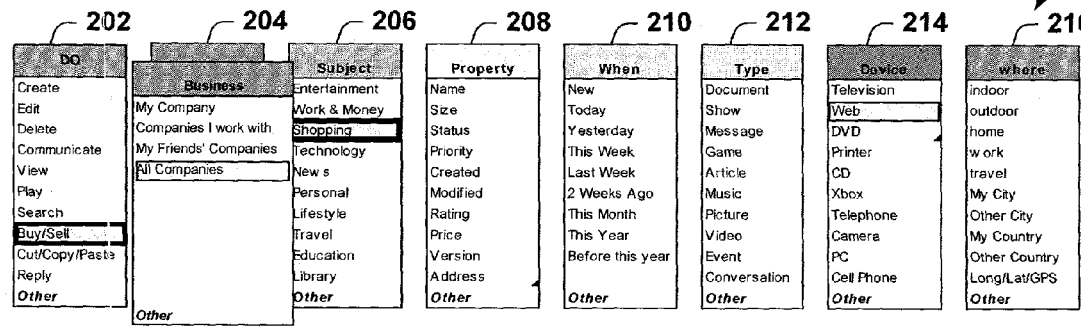

FIGS. 11A and 11B depict an example of a sequence that can be used for synonym searching across multiple columns according to an aspect of the present invention. For example, assume the user wants to purchase commercial goods, such as electronics, on the Web, but does not see the term "PURCHASE" in the visible columns of the GUI 200. The use can enter the search term "PURCHASE" in a search dialog box 282. An internal search engine determines which headings directly pertain to the term "PURCHASE" and highlights (e.g., graphically and/or audibly) where an appropriate synonym exists in the taxonomy, such as shown in FIG. 11B. Additionally, heading hierarchies (e.g., the WHO dimension 204) can be automatically expanded to show appropriate matching subheadings. Different visual cues further can be employed to indicate the relevancy of headings to the search term(s), such as by color of highlighting or the level of brightness.

It will be appreciated that the display of synonyms helps the user understand the taxonomy used in this system.

Additionally, selecting one of the synonyms might dynamically change metadata associated with the name used for the heading in the taxonomy for a particular user. Additionally or alternatively, a metadata service associated with the user interface can be programmed to adjust metadata for the taxonomy in response to learning about new synonyms selected by various users, which can help to improve its taxonomy. For example, if a number of users alter the taxonomy in a similar way (e.g., by selecting an alternative term from that displayed in the taxonomy), the metadata service can globally integrate this alteration for the benefit of other users. This enables a customization of the taxonomy for the user(s), so that the next time the user(s) encounters the heading, it would be presented with a name more familiar to the user or a group of users.

As mentioned above, particular headings may intentionally appear in multiple places to satisfy the belief that different users may think of information and/or command taxonomies in different ways. Accordingly, subheadings can appear in multiple places, providing redundancy that extends to the relationship between the canonical dimensions as well as within dimensions. For example, with reference back to FIG. 4, in the SUBJECT dimension 206, a CRAFTS subheading might appear both under SHOPPING and under LIFESTYLE headings. Some users further may conceive of shopping as an activity, appropriately placed in the DO dimension 202. Other users may instead conceive of shopping as subject matter area (such as tasks associated with researching purchases). Because of these multiple conceptions there can be an action under the DO dimension 202 labeled "Buy/Sell" as well as a heading labeled "Shopping" in the SUBJECT dimension 206.

Figure 12:
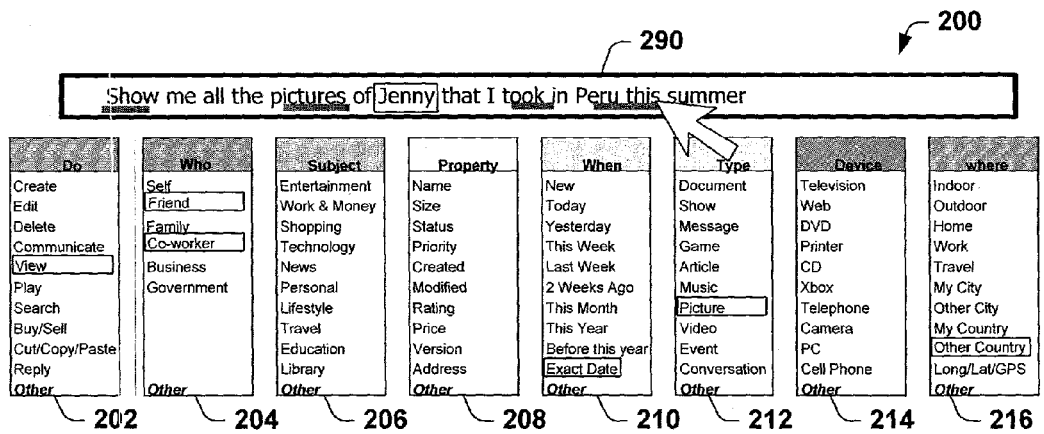
FIG. 12 is an example of a user interface generating a filter based a natural language input query in accordance with an aspect of the present invention.

FIG. 12 illustrates an example of the GUI 200 implementing a free-text filter based on information entered by the user according to an aspect of the present invention. The user can enter information for the query via any user input mechanism, such as text entered by a keyboard or voice data converted to text by an associated voice processor. The resulting information is provided in a text dialog box 290 associated with the GUI 200. An associated natural language engine determines which headings match the terms set forth in the dialog box 290. The relevancy of headings that match terms can also be indicated in the GUI 200.

For example, headings that exactly match search terms can be automatically selected, whereas headings that are possible matches can be highlighted as possible selections. The user can then select one or more of the highlighted possible selection if they are commensurate with the scope of the desired query. By way of illustration, a user might type into the dialog box 290: "Show me all the pictures of Jenny that I took in Peru this summer." The associated natural language engine would then use the set of terms and synonyms in the current taxonomy to present back to the user an indication of the filter as fully specified as possible based on the user input. For this example, the GUI may present a filter that includes the following criteria: DO/VIEW; "WHO/FRIEND, CO-WORKER; WHEN/EXACT DATE; TYPE/PICTURE; and WHERE/OTHER COUNTRY."

It is to be appreciated that terms from the free-text entry that are not resolvable (e.g. Jenny) can be highlighted appropriately in the text-entry dialog box 290. In addition, terms that have ambiguous synonyms in more than one place in the columns may cause those related headings to be highlighted as possible selections for the current filter. Until the user selects enough headings to disambiguate the interpretation of the free-text user input, the current filter may operate in an incomplete state. When in an incomplete state, the corresponding results pane (not shown) can show all relevant results, such as ranked by relevance.

Search terms that a user employs in the free-text search interface can be cross-referenced with the taxonomy to further refine the systems choice of which synonyms to display. For example, when the user tries to find a synonym by issuing a free-text entry associated with a particular column, the associated natural language engine utilizes the semantic content of that particular column for context to help narrow down from the list of possible synonyms.

Another aspect of the present invention provides feedback relating to a filter, such a predictive feedback to provide information to the user about possible filter consequences. The filter consequences, for example, can include an indication of number of results and/or how long it may take to retrieve results if a particular heading is selected (e.g., results of images may take longer to retrieve than text). The feedback can be presented graphically, textually and/or audibly in connection with the user interface.

Figure 13:
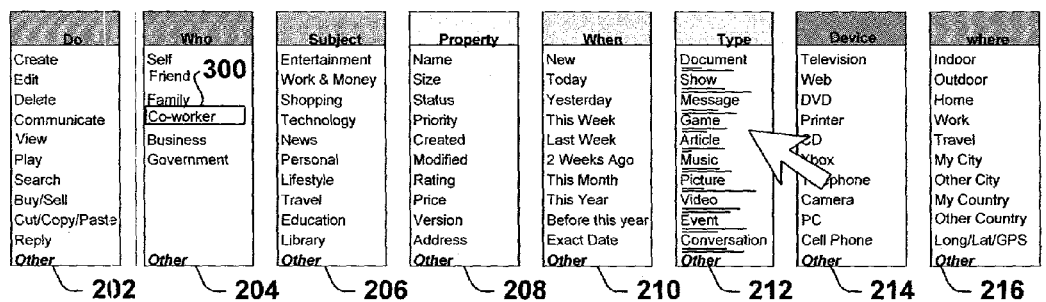
FIG. 13 is an example of a user interface implementing predictive feedback for a selected heading in accordance with an aspect of the present invention.

By way of example, FIG. 13 illustrates the GUI 200 in a condition where a CO-WORKER heading, indicated at 300, has been selected from the WHO dimension 204. In response to the selection 300, the GUI provides predictive feedback associated with other headings by superimposing simple bar graphs over each heading that indicate possible consequences pertaining to results that would be obtained if that heading were selected. Differently colored bar graphs further could be employed to indicate different types of consequences. For example, a red graph might be used to indicate a magnitude for the number of possible results for a heading, while a green graph indicates an approximate length of time for obtain the results.

Figure 14:
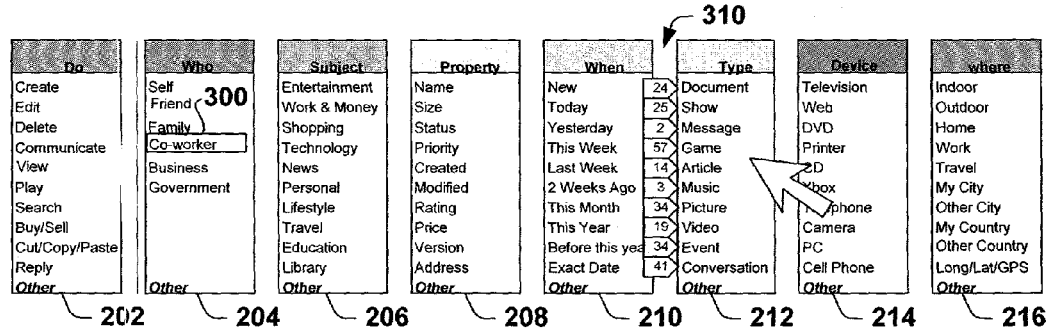
FIG. 14 is an example of a user interface implementing predictive feedback for a selected heading in accordance with an aspect of the present invention.

Alternatively or additionally, the GUI 200 can be programmed to display possible filter consequences textually, as represented in FIG. 14. For example, the number of results can be presented as call out displays 310 adjacent headings for one or more selected dimensions. The feedback can occur automatically or in response to the user selecting a dimension, such as by hovering over a dimension. In the example of FIG. 14, call out displays 310 are provided for each of the headings visually represented in the TYPE dimension 212.

There are cases where, given a particular set of selected headings to form a current filter, some of the unselected headings may not be relevant as possible refinements to the current filter. Therefore, to help reduce visual clutter in the GUI and to reinforce the relationship between different headings in the information taxonomy, the GUI can modify the appearance, such as by de-emphasizing or even hiding remaining headings that may be irrelevant to the current filter according to an aspect of the present invention.

For instance, where the user has already selected a combination of headings to obtain information or implement a task (e.g., DEVICE/CD, TYPE/MUSIC, and DO/PLAY), with current hardware connections, it likely would be meaningless to also select the heading DEVICE/TELEPHONE. Accordingly, the DEVICE/TELEPHONE heading would gain a visual cue (e.g., a reduction in brightness, hiding the heading, reducing its size relative to other headings, etc.) to indicate its current irrelevance. Of course, those skilled in the art will appreciate that the foregoing example merely describes the concept, as with a sophisticated interconnected home-network it would be possible to patch background music into a telephone conversation and in this case the option would be available. Thus, the visual cues can be applied based on the configuration of the system and taxonomy in which the GUI operates. As capabilities of hardware and software evolve, the possible relationships shown in the GUI 200 also evolve.

While most discussions thus far have focused on providing results textually, such as in the results pane 222 shown in FIG. 6, it is to be appreciated that results also can include graphical features. The presentation of results, for example, can vary as a function of which dimension associated with the current filter is designated at primary. A results pane thus can be reconfigured to present results in a format designed to correspond to the type of information (or command) being sought by the user.

Figure 15:
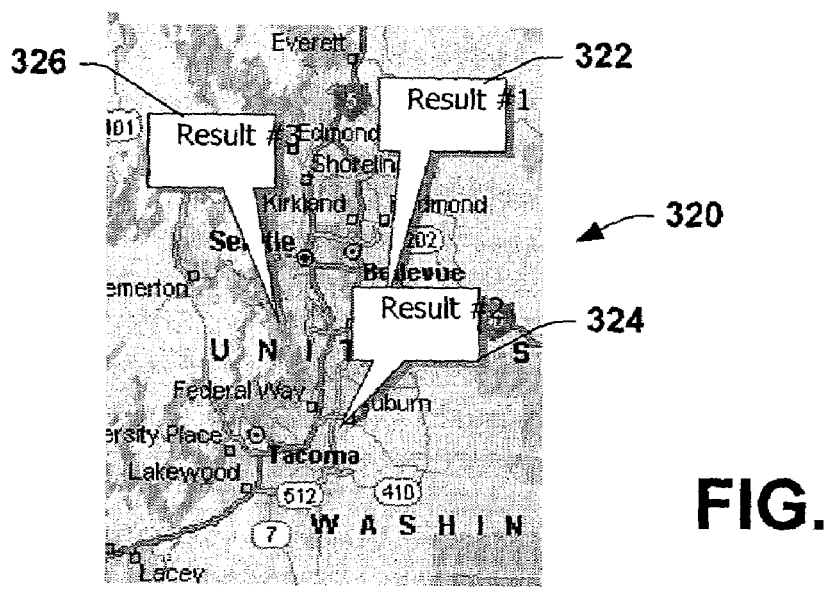
FIG. 15 is an example of graphical results for a filter implemented in accordance with an aspect of the present invention.
Figure 16:
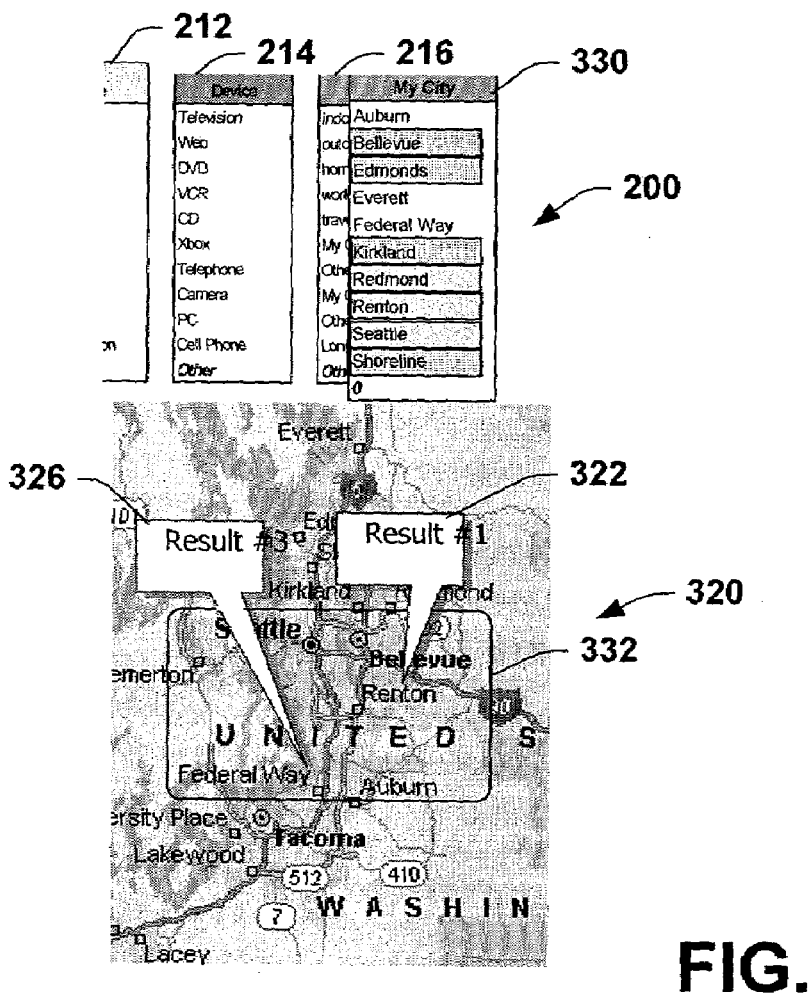
FIG. 16 is an example of graphical results for a filter implemented in accordance with an aspect of the present invention.

FIGS. 15 and 16 illustrate examples of results that can be provided in connection with a filter employing the WHERE dimension as the primary dimension. In particular, FIG. 15 depicts a results pane 320 configured as a map of a region selected in the WHERE dimension. Results items 322, 324 and 326 of the current filter are shown spatially oriented on top of the map to identify locations associated with the respective results. The user can select the respective results items 322–326 to provide greater information about the results and/or an enlarged view of the region shown in the results pane 320.

By way of further example, if the user selects the heading MY CITY from the WHERE dimension and NEWS from the ABOUT dimension, display objects (e.g., icons) that represent news stories relevant to the user's home town can be shown superimposed in the locations associated with each news story.

After selecting one or more items in the graphical results pane 320, the user also can issue a command to refine the filter based on the selected items, such as illustrated in connection with FIG. 16. FIG. 16 shows part of the GUI 200, including a subheading display object MY CITY 330 expanded out from the WHERE dimension 216. The results pane has been modified from that shown in FIG. 15 due to changes in the current filter. For example, a user could gesturally drag out a "rubber band" region 332 on the map-centric view of the results pane 320, right-click to display a context-menu, and then select an option called RESTRICT FILTER TO SELECTED REGION. After doing this, results items in the results pane 320 that are not in the refined region (e.g., item 324 associated with the subheading AUBURN in FIG. 15) would be removed from the display and the selected heading in the WHERE dimension 216 would change to reflect the results for the specific region selected. Alternatively, the user can deselect one or more headings from the GUI 330 to refine the current filter and the corresponding results.

Figures 17, 21, 22:
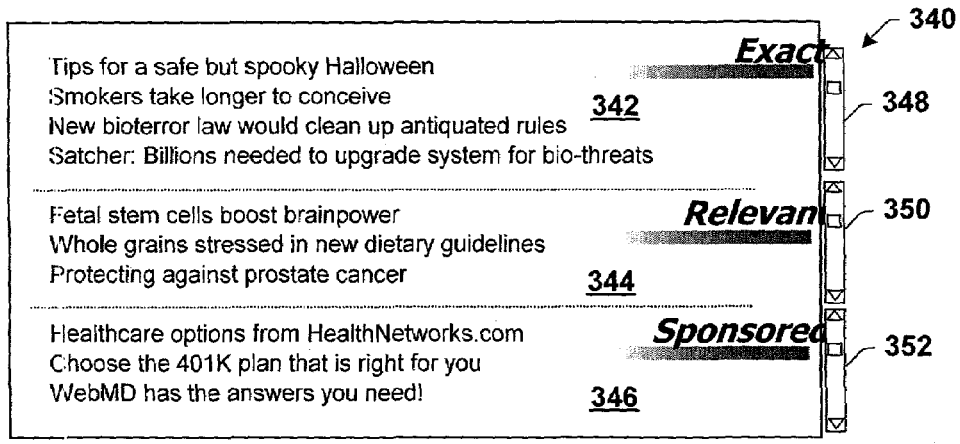
FIG. 17 is an example of a results for a user interface arranged by relevance in accordance with an aspect of the present invention.
FIG. 21 is an example of part of a user interface displaying results sorted in accordance with an aspect of the present invention.
FIG. 22 is an example of part of a user interface displaying results sorted in accordance with an aspect of the present invention.

FIG. 17 illustrates another example of a results pane 340, that can be employed to present the user with results for a current filter constructed based on one or more selected headings in accordance with an aspect of the present invention. The results pane 340, for example, is divided into several regions 342, 344 and 346 that display additional information to the user, including multiple levels of relevancy for the current filter. Each region 342, 344, 346 can include an associated user interface element 348, 350, 352 to enable scrolling through the list of results in each respective region. Those skilled in the art will appreciate various possible divisions or categories of regions that could be implemented as part of the results pane 340 in a GUI according to an aspect of the present invention.

By way of example, the results pane 340 in the example of FIG. 17 includes three regions, namely, an EXACT region 342, a RELEVANT region 344, and a SPONSORED region 346. The EXACT region 342 includes those results that directly match or satisfy the current filter. The RELEVANT region 344 includes additional items deemed as related to the current results. For example, the results items in the RELEVANT region 344 might be items that satisfy most of the selected filters or might satisfy filters composed of headings of the selected commands. This provides the user with serendipitous discoveries analogous to finding interesting books near an initially desired book in a library. The SPONSORED region 346 displays items that are deemed by a service-provider or data-provider as being particularly relevant to the user given the general scope of the current filter. For instance, the user may have selected a filter having to do with travel in Southeast Asia. The data-provider may choose to put an item called "Find cheap air-fares" in this section of the Results Pane.

As described herein, there are many ways in which users can select and edit (or refine) filters. One way is to select one or more textual headings that encapsulate a query (see, e.g., FIG. 5). For example, selecting the heading labeled MUSIC from the TYPE dimension 212 filters the results to show only those items that are of type music. This could include music files, recordings, or even sheet music. Headings such as SIZE, and PRICE (both within the PROPERTY dimension) and dimensions such as WHEN provide entry points into selecting from a continuous set of values. Thus, a GUI implemented in accordance with an aspect of the present invention can present the user with appropriate user interface elements to enable the user to select a desired continuous value from a range of continuous values.

Figure 18:
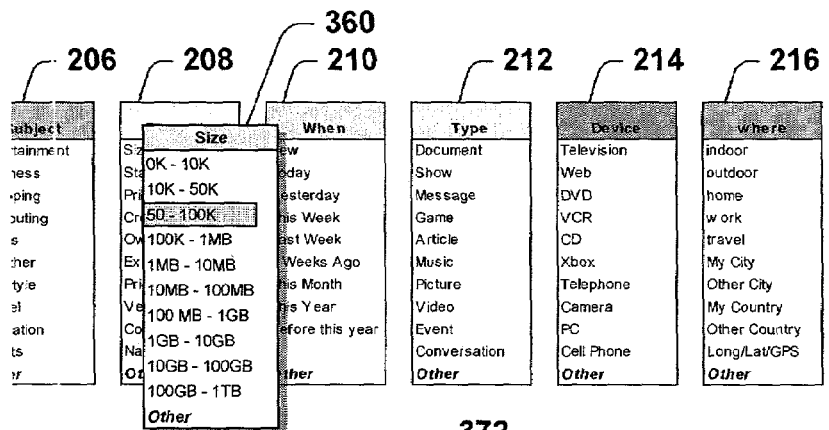
FIG. 18 is an example of a user interface having a display object configured to facilitate selecting among continuous values in a selected heading in accordance with an aspect of the present invention.
Figure 19:
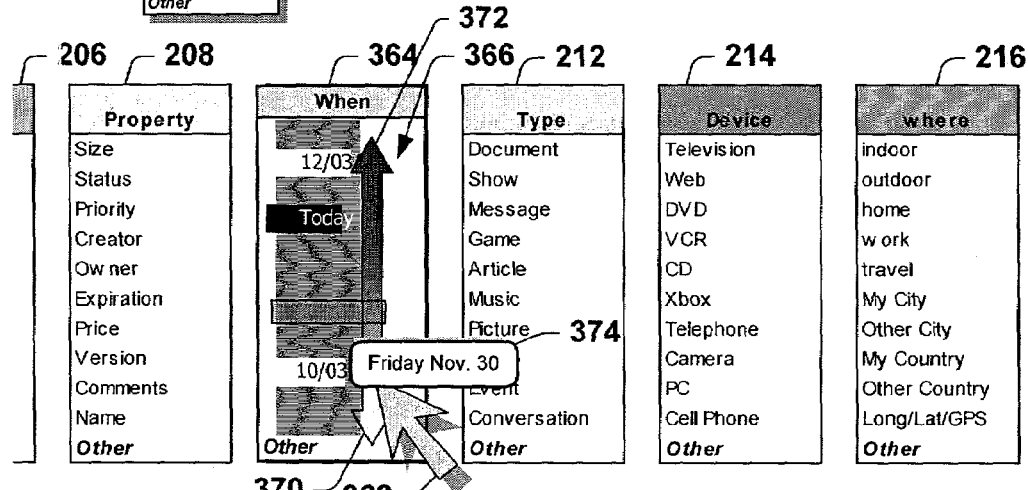
FIG. 19 is an example of a user interface displaying a user interface feature to facilitate selecting from among continuous values in a dimension in accordance with an aspect of the present invention.
Figure 20:
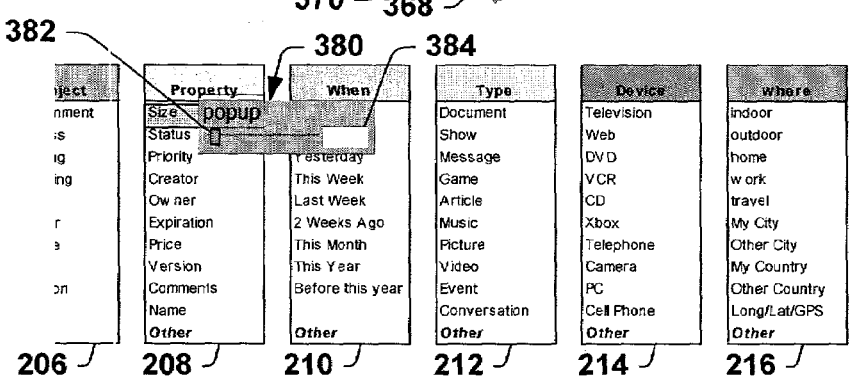
FIG. 20 is an example of a user interface displaying textual and graphical user interface feature to facilitate selecting among continuous values for a selected heading in accordance with an aspect of the present invention.

By way of illustration, FIGS. 18, 19 and 20 depict different approaches that can be employed to facilitate selecting an appropriate value from a set of continuous values according to various aspects of the present invention. In FIG. 18, a SIZE subheading display object 360 is superimposed over the PROPERTY dimension 208 to provide a list of corresponding sizes that can be selected to narrow the current filter criteria. Thus, the user can add values (or sets of values) to the filter by either selecting from the automatically generated textural list or by entering a desired quantity manually, such as by selecting the OTHER subheading.

FIG. 19 depicts a reconfigured WHEN dimension 364 that includes a slider object 366. For example, the slider object 366 corresponds to a timeline that could be provided for in place of the type of WHEN dimension having related text-based headings. The user employs a pointer 368 to select a desired position along the slider 366 between ends 370 and 372 of the slider. Alternatively or additionally, the slider may include an adjustable slider object that is moveable between its respective ends 368 and 370. A pop-up dialog 374 also can be presented in conjunction with the slider to more particularly identify the time selected with the slider 364.

FIG. 20 illustrates a graphical and textual display object (e.g., a pop-up selector) 380 that can be employed to select and present a selected continuous value or range of values. In FIG. 20, the selector 380 is associated with a SIZE heading of the PROPERTY dimension 208, although such a selector can be utilized with respect to any dimension or heading that may encode a set of continuous values. The selector 380 includes graphical representation of a slide (e.g., thumb of a slider) 382 that can be adjusted to a desired position. The selector also includes an associated window 384 that displays a value based on the position of the slide 382. The value can be an actual value, a percentage of an available range or scale, for example. As new visualization and related selection techniques are developed, these techniques can be integrated into the interface framework as views for particular dimensions.

After editing the filter via any of the means for selecting continuous values (e.g., as illustrated in FIGS. 18–20), a visual cue can be displayed adjacent the appropriate heading to denote its current setting. The display of and interaction with individual dimensions can be even further optimized by presenting highly specific views for each column. For example, an interactive map (e.g., similar to that shown in FIGS. 15 and 16) could be used for the WHERE dimension 216. These types of specialized dimension or heading views further would include cues for indicating the selected region and user-interface elements or controls for changing the range displayed in each unbounded dimension. The interactive map example should include the ability to change both the zoom-level and panned region. The linear arrangement of canonical dimensions (as shown in many of the figures) is only one of many different kinds of layouts. In general, different dimensions, such as Time and Space each are best served by views that are optimized for that particular type of attributes and data.

As described herein, various relationships between results for a current filter can be presented in a variety of ways. The optimum presentation format typically depends on the filter criteria and which criteria are employed to sort the results. FIGS. 21–24 depict examples of results panes employing different sorting criteria that can be used to present results items according to various aspects of the present invention. For example, the results depicted in FIGS. 21–24 could be presented in response to constructing a particular filter to show "documents related to my co-workers from the last month (WHO/CO-WORKER, WHEN/THIS MONTH, and TYPE/DOCUMENT). Any given co-worker may have authored many documents during the last month and any of these documents might in turn have multiple authors.

FIG. 21 illustrates an example of a results pane 400 with results sorted by documents with multiple people listed in each line in connection with respective documents. FIG. 22 shows results pane 410 with results sorted by person with multiple documents listed in each line for associated persons. FIG. 23 depicts a results pane 420 with results sorted by people, with one line for each document within each of a plurality of person sections. FIG. 24 provides an example of a results pane 430 with results sorted by documents and one line used for each person with in each document section. Most of these examples presuppose that the user (or the system by default) has designated one of the dimensions (or headings) as providing a primary sort. For instance, in FIG. 23 the primary-sort is on the WHO dimension, such that there is only one listing for each name but multiple listings for each document. Those skilled in the art will understand various other formats and sorting criteria that could be employed to present results to the user.

Figure 25:
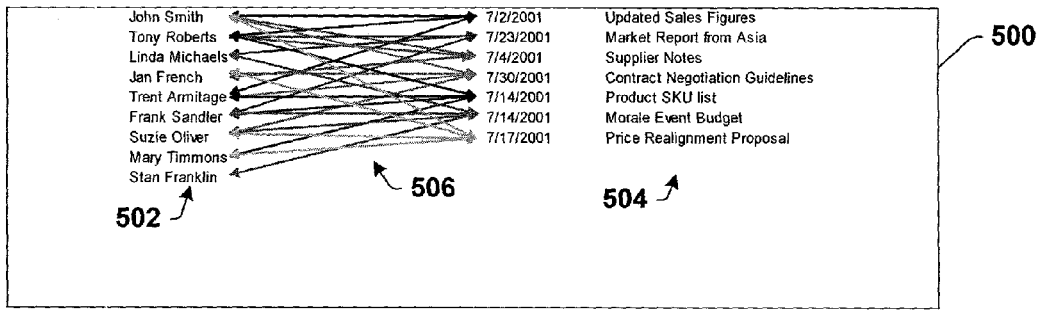
FIG. 25 is an example of part of a user interface visualizing relationships between results displayed in accordance with an aspect of the present invention.

Other examples of visual indications (or cues) that can be employed to represent relationships between results are depicted in connection with the result panes of FIGS. 25–29, in which similar reference numbers refer to similar parts in the various views. In FIG. 25, a results pane 500 for the current filter includes two columns of display objects, namely a person column 502 and a document column 504. One person appears on each line of the person column 502 and one document is on each line of the document column 504. Relationships between all items in the respective columns are indicated by interconnecting visual cues (e.g., arrows) 506.

Figure 26:
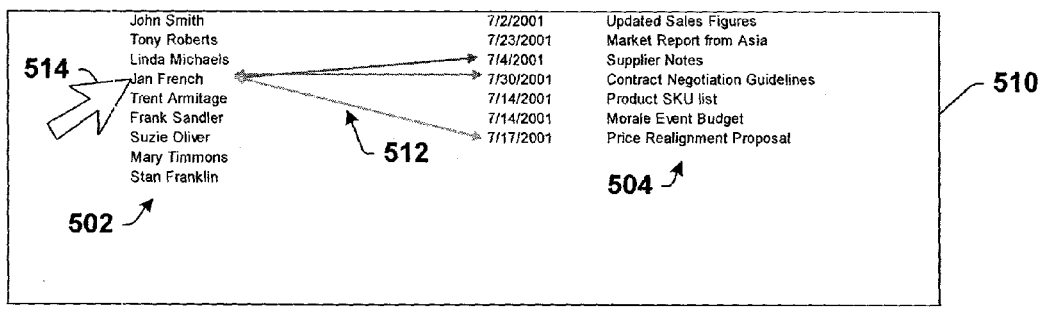
FIG. 26 is an example of part of a user interface visualizing relationships for a selected item displayed in accordance with an aspect of the present invention.

FIG. 26 depicts a results pane 510 similar to FIG. 25, as it includes columns 502 and 504 with individual results items on each respective line. Visual cues 512 show correspondence between a particular person (e.g., Jan French) and their associated documents. The visual cues 512 can be triggered, for example, by selecting the person, such as by clicking on the person or hovering a pointer 514 over the person's name in the results pane 510.

Figure 27:
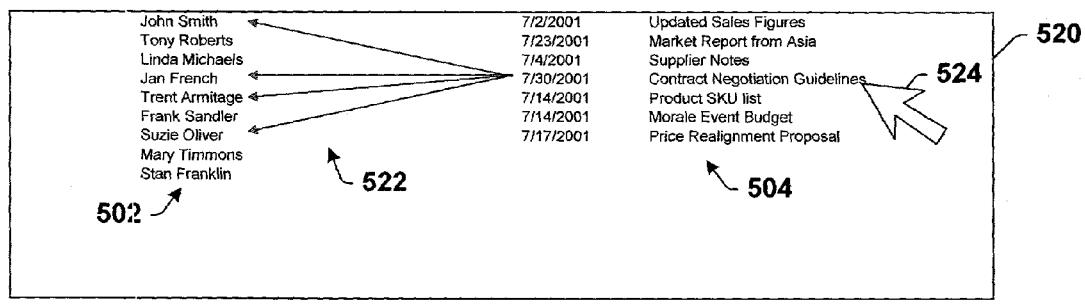
FIG. 27 is an example of part of a user interface visualizing relationships for a selected item displayed in accordance with an aspect of the present invention.

FIG. 27 shows a results pane 520 with a different set of relationships between items in the columns 502 and 504. In the example of FIG. 27, visual cues 522 show correspondence between a particular document, which can be selected by a pointer object 524, and its associated people.

Figure 28:
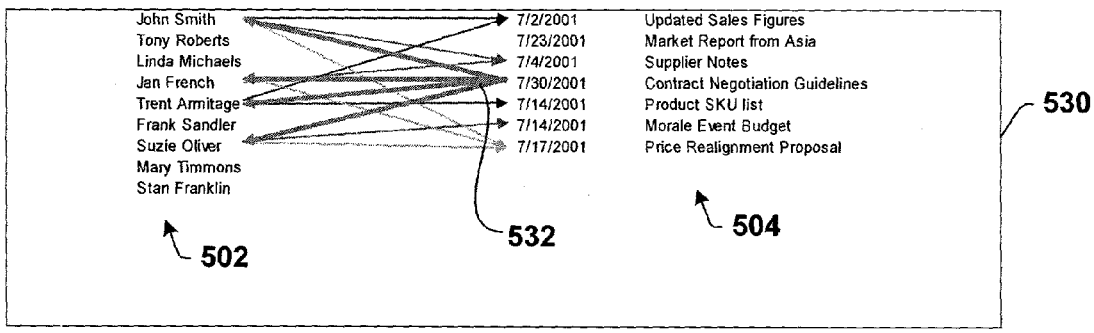
FIG. 28 is an example of part of a user interface visualizing relationships for a selected item and corresponding items displayed in accordance with an aspect of the present invention.

A particularly interesting example is depicted in the results pane 530 shown in FIG. 28. In FIG. 28, the selection of a document item essentially propagates with a falloff function, namely, a falloff degree of two. For example, the user employs a pointer to select the document object "Contract Negotiation Guidelines" and those co-workers who are associated with the document are indicated by a first set of corresponding visual cues (indicated as thick lines) 532. Additionally, one more level of relationships can be displayed by the system implicitly simultaneously selecting each of the co-workers associated with the aforementioned document and, in turn, providing a second set of visual cues from those co-workers and their associated documents. Different types of visual cues (e.g., different line thicknesses and/or different line colors) can be used to distinguish the different relationships being represented by such visual cues. It is to be appreciated that the user can adjust the levels of selection propagation and falloff function for the visual display of the selection to vary the amount of visual clutter and also determine how many relationships can be seen at once.

Figure 29:
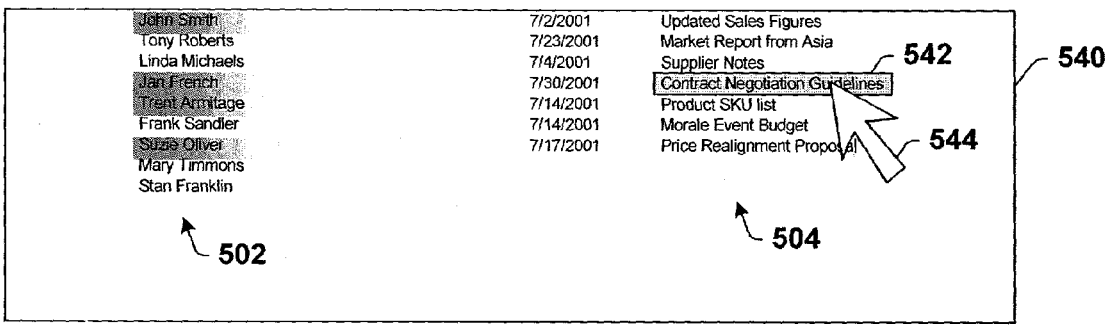
FIG. 29 is an example of part of a user interface visualizing relationships for an item selected in accordance with an aspect of the present invention.

FIG. 29 depicts a results pane 540 in which relationships from a selected item in column 504 to items in column 502 are represented by highlighting the items in the other column. For example, the document object 542 for "Contract Negotiations Guidelines" has been selected, such as by hovering a pointer 544 over the item. This results in people in column 502 that are associated with this document being dynamically highlighted in response to the pointer 544 hovering over the document object. Those skilled in the art will appreciate other types of visual cues that could be employed to indicate an association or relationship between items in a results pane according to an aspect of the present invention.

While many of the foregoing examples of GUIs described above employ a general information and/or command taxonomy for general purpose information searching and performing tasks, those skilled in the art will understand and appreciate that a taxonomy to filter command and information databases can also be extended to other, more specific domains according to an aspect of the present invention.

For instance, FIG. 30 illustrates a GUI 600 configured as a taxonomy to support a typical internal business application, such as can be used to track employees and gather statistics and the like. The GUI 600 includes the following general dimensions: an EMPLOYEE ACTIONS dimension 602, a WHO-TITLE dimension 604, a SUBJECT-EMAIL LISTS dimension 606, a PROPERTIES dimension 608, a WHEN dimension 610, a TYPE dimension 612, a DEVICE-ASSETS dimension 614, and a WHERE dimension 616. Other taxonomies also could be used. Each of the dimensions 602–616 includes headings related to the dimension in which they are associated. Because the taxonomy shown in the GUI 600 is substantially similar to those shown and described above with respect to FIGS. 4–29, for example, users familiar with a taxonomy for a particular application area should be able to easily use it for another application domain. This process of user acclimatization is aided if graceful transitions (e.g., via animation) are used to change from one configuration of dimensions to another.

There are several ways to transition from one configuration of the taxonomy to another. First, the user can navigate through the DO dimension to find the appropriate set of domain specific actions. For example, to get from the default configuration shown in most of the preceding examples (e.g. FIG. 4) to the aforementioned human-resources application of FIG. 30, the user might go through a sequence such as click on "Search", then "Tools", and finally "Human Resources." Alternatively, the user might first select "Co-worker" and "View" (from the "Do" dimension). Next the user would, via a context menu, select an option called "Display dimensions that are optimized for the current results," after which the set of headings and commands would optimize themselves for the current user-specified domain.

As mentioned above, the interface can be used not only to filter items and relationships from a database, but also to issue a wide range of commands to linked applications and/or devices according to an aspect of the present invention. In this kind of configuration, the taxonomy-based GUI becomes a domain-specific task-based user-interface where items in an associated results pane can correspond to fully specified tasks. The headings in each column enable the user to iteratively search through the task space. This is in contrast to the disparate ways that users can find commands in a typical application: either by looking through a set of fixed menus or by searching in a linked help system. Composing the command space into a taxonomy that then accesses dynamically generated tasks unites these two disparate interface techniques in accordance with an aspect of the present invention.

A generic command, such as "Play", generally requires less hierarchical heading navigation on the part of a user. With the standard configuration (e.g., FIG. 4), for example, a user would select "Do/Play" and "Device/DVD" to instruct the DVD player to start. As mentioned above, the dimensions and headings can be reconfigured by the user to fit a particular application or device's need.

Using a taxonomy-based command interface, in accordance with an aspect of the present invention, for displaying a set of commands supports the variance in the way that users remember and use commands in typical applications. For example, many conventional applications use a command-specification sequence, typically referred to as "noun-verb," where the user first selects an object, then issues a command to that object. An example operation is a user selecting text and then clicking on a button to make the text bold. When the intended action becomes more complicated the command sequence is often extended to "noun-verb-noun." These kinds of command interfaces typically require a strict ordered sequence of actions on the part of the user. Accordingly, they can be confusing and error prone, such as if the guidance cues presented to the user are not salient enough. Thus, if the user gets out of sequence, unintended consequences can result in conventional systems.

In contrast, when commands and actionable objects are presented in a taxonomy-based command interface implemented in accordance with an aspect of the present invention, the user is freed from the reliance on strict ordering of command sequences. That is, the command interface is flexible as it is not restricted to a particular order of command and parameter terms.

With reference to FIG. 31, an example of a command interface GUI 620 according to an aspect of the present invention is illustrated. The GUI 620 includes dimensions 622–636 configured for controlling various computer controllable devices, such as in an electronically wired home or office. The dimensions 622–636 are populated with headings according to an application-specific taxonomy constructed to facilitate performing associated available tasks.

By way of illustration, if the user selects a "noun" such as the heading FURNACE from the DEVICE dimension 634, command headings, such as SET, that apply to FURNACE can be highlighted. Alternatively or additionally, unrelated headings could be de-emphasized from the GUI to indicate their irrelevance to the selected FURNACE heading, as described herein. If the SET heading is then selected, the properties that can be set, including, for example, START TIME, STOP TIME, and etc., are then highlighted. Alternatively, the user could first select "START TIME and those devices (e.g., "nouns") to which it makes sense to do something with the "Start Time" would, in turn be highlighted. In this way, the user can specify a command-object sequence in practically any order: "noun-verb-noun", "verb, noun, noun", etc. The flexibility of sequence ordering generally depends on how rich the metadata associated with the system is.

By way of further illustration, with the default configuration of dimensions and headings for a general information/command taxonomy, such as in FIG. 4, a user may have to engage in a fair degree of heading navigation to issue specific application or device commands, such as "Count the number of words in document Foo." Thus, as illustrated in FIG. 32, selected dimensions of the general interface 200 (e.g., FIG. 4) can be configured to form a command interface GUI 640 suitable for a simple word-processor, which can be accessed, for example, through a more general command interface. Alternatively, the GUI 640 can be implemented as a stand-alone interface.

For example, the GUI 640 includes a command dimension DO-PROCESSING 642, a SUBJECT dimension 644, a PROPERTIES dimension 646 and a TYPE-SELECT dimension 648. Each of the dimensions 642–648 includes associated headings and subheadings that form a taxonomy to facilitate use of an associated word processing application. It is to be appreciated that with a hierarchical composition of commands and objects, the set of dimensions 642–648 could accommodate even more complex application emulation.

FIG. 33 illustrates an example of using a GUI 650 configured according to a taxonomy for accessing a database of corporate research in accordance with an aspect of the present invention. The GUI 650 divides the taxonomy into five base dimensions, such as a PEOPLE dimension 652, a TOPICS dimension 654, a PROJECTS dimension 656, a FILES dimension 658 and a DATES dimension 660. When this taxonomy is cast into the GUI 650, according to an aspect of the present invention, users can quickly find relationships between different projects, cross-workgroup topics, and breadth of work from particular individuals and so forth.

This kind of user-interface could show, for example, that twenty people are working in the area of data mining, such as by selecting a DATA MINING heading in the TOPICS dimension 654, and that two of the projects in Data Mining are called Project I and Project III. From this a user could then easily find out which particular personnel are working on the Project III. These and other types of relationships may not initially be listed in any corporate database. Instead, the only relationships defined might be between people and workgroups, between workgroups and topics, and between workgroups and projects, for example.

Since it is known what workgroup a particular person is in and what topics that workgroup is associated with, an implicit relationship between workgroup members and those set of topics can be made—likewise for the set of projects—in accordance with an aspect of the present invention. These relationships may not be entirely accurate, however, as not every member of the workgroup works on every topic associated with that workgroup. The degree to which erroneous data is displayed as a result of setting up a particular filter is dependent on the balance between implicit and explicit relationships. Because a system and user interface, according to an aspect of the present invention, supports facile editing of relationships within the same viewing environment, mistakes can quickly be corrected as they are encountered, as described herein.

For example, the GUI system implemented according to an aspect of the present invention permits users to dynamically assign metadata to items in the database and/or modify existing metadata of data items. The changes can be implemented in response to the user modifying headings or relationships presented to the user through the GUI. This is very useful for correcting errors in the data, such as can result from erroneous data-entry or an over-reliance on implicit relationships between data items, to compensate for missing metadata. Errors can typically be of two types: (i) the system might incorrectly think that a particular heading does not have a relationship to an item in the database (referred to below as an "incorrect negative association") or (ii) that a heading incorrectly does have a relationship to the given item (referred to below as an "incorrect positive association"). The user generally cannot simply tell the system to remove this item from the result set, as it may be ambiguous to the system which relationship (if there are more than one selected headings) is incorrect. Instead, the user interface can enable the user to correct these mistakes in the following ways.

By way of illustration, with regard to an incorrect negative association, the user selects a set of filters, such that some results items appear in the results pane of the GUI. The user selects an additional heading to modify the current filter and notices that one of the items in the Results Pane is incorrectly removed to satisfy the filter. Thus, to correct this scenario, for example, the user can turn off the last selected filter, select the item in question in the results pane, open a context-menu from the item, select "Create Association" from the menu, then click on the filter that was not correctly associated with the item.

With regard to an incorrect positive association scenario, the user selects a set of headings to construct a corresponding filter that provides a few results items in the results pane. The user notices that one (or more) of the items should not appear in the Results Pane because it does not apply to the current filter. To correct the incorrect positive association, for example, the user can select the item in question in the results pane, open a context-menu from the item, select "Delete Association" from the menu, then click on the heading that was incorrectly associated with the item.

By way of further example, referring back to FIG. 4, the user selects VIEW heading from the DO dimension 202, SELF from the WHO dimension 204 and then DOCUMENT from the TYPE dimension 212. All documents that apply to the user are then displayed in the Results Pane based on the current filter. The user then selects "Priority/High" from the PROPERTY dimension 208. Immediately, the results are narrowed down to show only those items which are also a priority metatag of "High" assigned to them. When this happens, the user may notice that a particular item, that the user erroneously thought was high-priority, is removed from the results. To change this, for example, the user deselects the high-priority heading, which causes the desired item to reappear in the results pane. After clicking on a "Create Association" context button (not shown), the user clicks on the "Priority/High" heading, thus assigning "Priority/High as a property or attribute of the item, which assignment is applied to metadata associated with the item. In general, this kind of action is only valid for metadata that is user assignable. User-assignable metadata, for example, for a document or file could include "Subject", "Status", "Priority", "Rating", and "Who." Meta-data such as "Created by" and "Type" are usually not user editable, although these permissions could be determined by the creator of the particular filter set. It can be appreciated that an implementation of this user interface would include visual and or other cues to indicate to the user which metadata is user-assignable and which is intrinsic to particular items in the database.

Another simpler example illustrates how this system could be used for the general task of tagging items with user-assigned metadata. A user selects "Document" from the "What" dimension. A list of all documents within the system's database is displayed. A user can then assign "tag" (assign metadata) to any number of results items by dragging assignment proxies from subheadings onto individual items. Conversely, the user can drag proxies of an item or sets of items from the results view to and drop on top of subheadings that represent desired metadata.

There are many cases will users will desire to have views of metadata for items in the results view, where that particular metadata is not a contributor to the current filter. In one example, a user might want to see a list of all documents that are about "Fishing." The user then might want to sort these documents by date of creation. To do this, the system lets the user display metadata (such as date) even if that metadata is not part of the current filter. The items in the results pane can also be sorted by any of the displayed metadata dimensions.

FIGS. 34–43 provides some additional specific examples of GUIs that could be implemented as information and/or command interfaces to facilitate specification of queries and command tasks according to various aspects of the present invention. More particularly, FIGS. 34–39 depict screen shots corresponding to various information queries and tasks that can be implemented using a general information and/or command interface relative to one or more databases. For purposes of brevity and ease of explanation, similar reference numbers are used to designate corresponding parts in the FIGS. 34–39. FIGS. 40–43 provide more specific examples of an interface arranged according to a taxonomy designed for accessing a database of corporate research, such as could be implemented over the Internet or an intranet.

Figure 34:
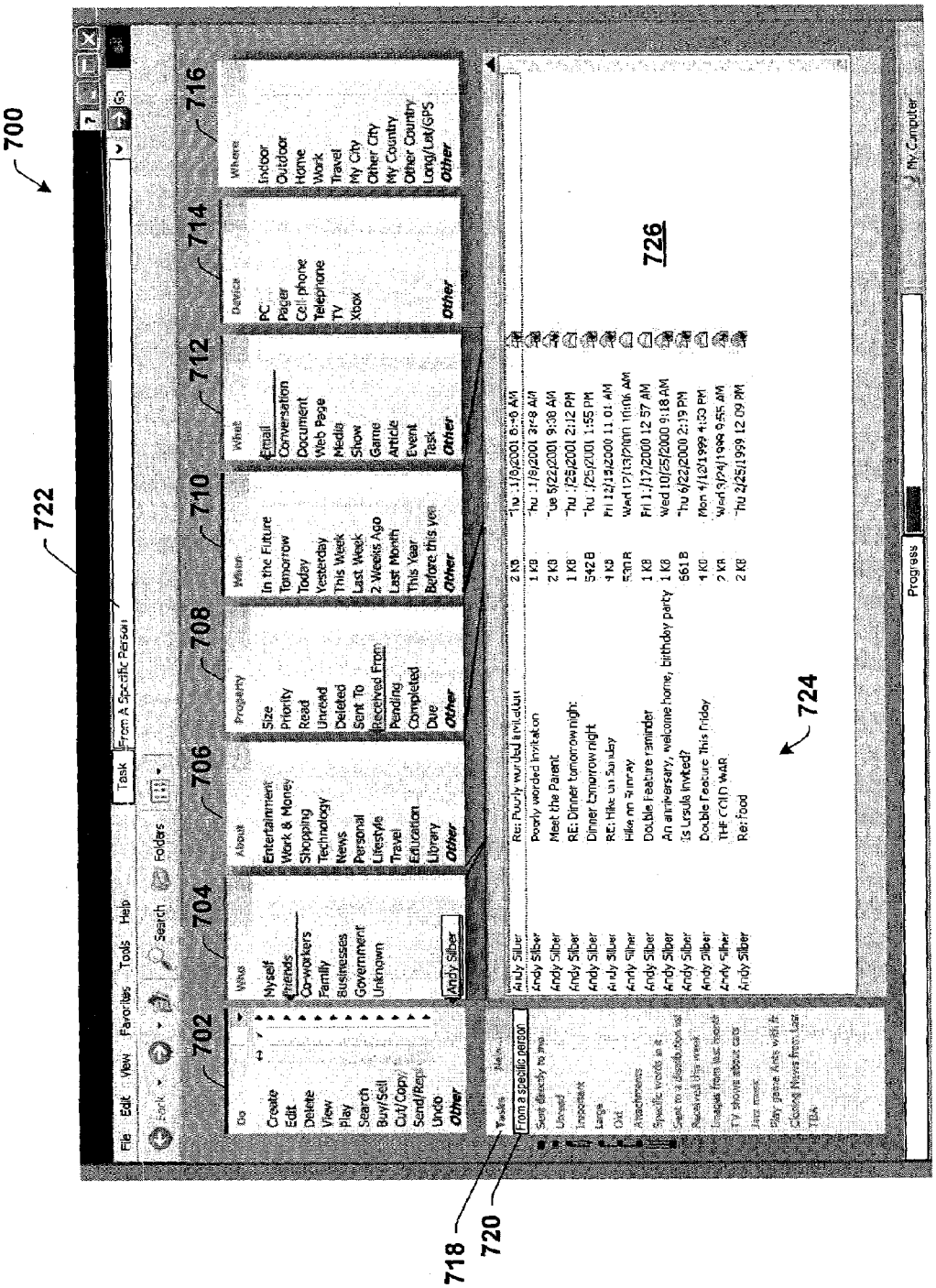
FIG. 34 is a screen shot illustrating an example of a user interface configured to display results of an information query implemented in accordance with an aspect of the present invention.

FIG. 34 depicts an example of an information and/or command interface GUI 700 implementing a particular information filter. The GUI 700 includes a collection of dimensions 702–716 arranged according to a general information/command taxonomy. Also depicted is a dimension 718 of predefined filters or tasks, such as can pertain to recently implemented or frequently implemented tasks or queries. Additionally or alternatively, a user can create predefined filters in this or other dimensions so that convenient filters will be readily available for the user. In the example of FIG. 34, the user has selected headings to create a filter having the following properties: WHO/FRIENDS/ ANDY SILBER; PROPERTY/RECEIVED FROM; and WHAT/EMAIL. The filter, at least in part, could be created by selecting a corresponding predefined task (e.g., "From a Specific Person") 720 from the dimension 718, such as corresponds to a recently used filter. Alternatively, the user can select the appropriate combination of headings and subheadings from the dimensions 702–716 to implement the filter, such as through a suitable user input device (e.g., mouse, keyboard, voice interface device, etc.). The particular task being implemented is shown in a task window 722 with corresponding results 724 presented as interactive display object in a results pane 726.

Figure 35:
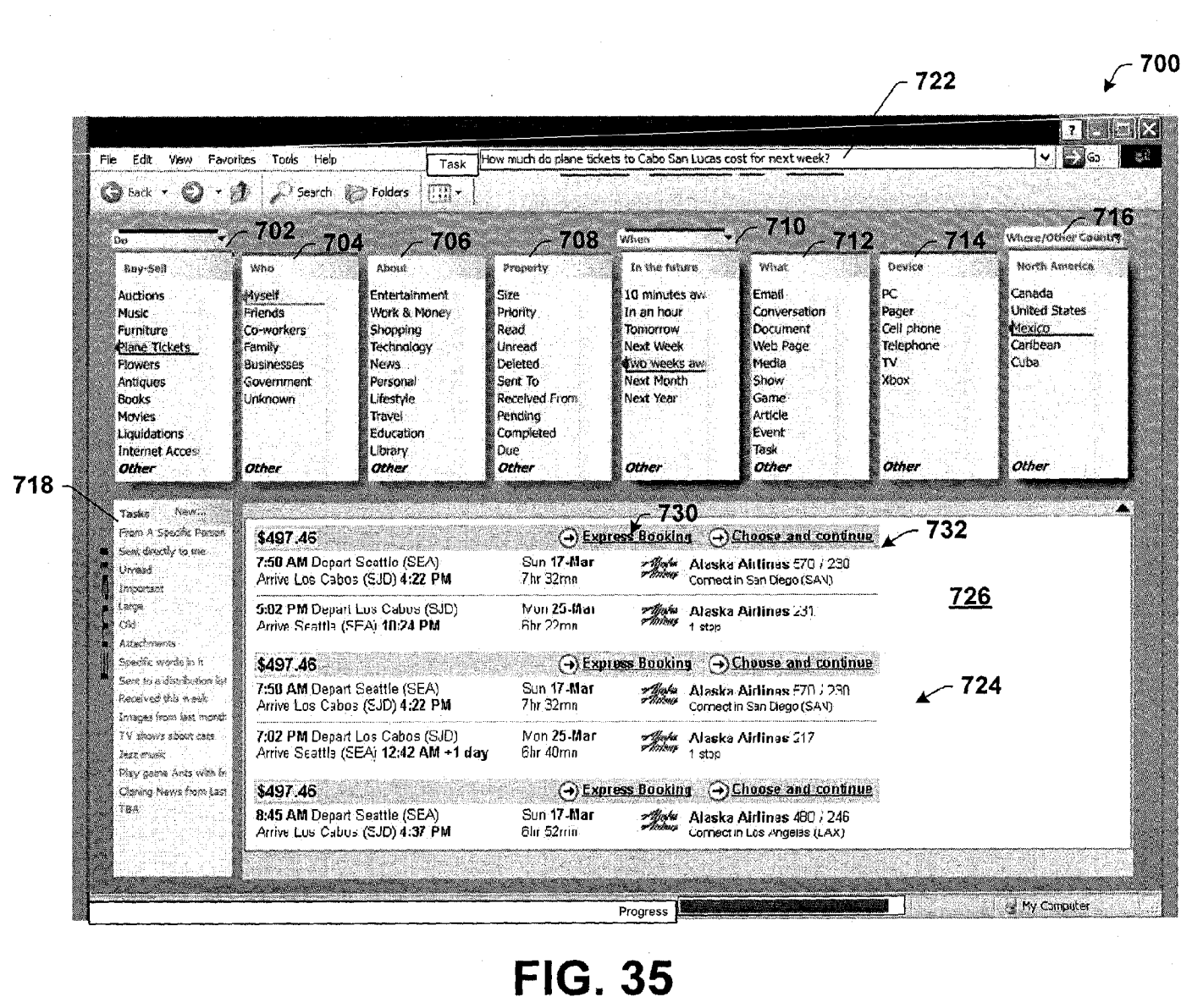

FIG. 35 depicts the GUI 700 as implementing an information query related to a possible business transaction, such as purchasing an airline ticket. In the particular example of FIG. 35, the filter is composed of DO/BUY-SELL/PLANE TICKETS, WHO/MYSELF, WHEN/IN THE FUTURE/ TWO WEEKS, and WHERE/OTHER COUNTRY/ MEXICO. As described herein, the filter for implementing the query can be entered as a free text query, such as by entering "How much do plane tickets to Cabo San Lucas cost for next week?" in window 722, or by selecting appropriate headings and subheadings across the dimensions 702–716. The results 724 thus present the user with possible airline reservations and airfare that satisfy the filter. The user can select a desired flight, for example, by clicking on corresponding user interface elements, such as an express booking display object 730 or a "Choose and continue" display object 732 associated with the flight of choice. It is to be appreciated that with the GUI 700, the user can iteratively modify the current filter to obtain different information or to sort the information differently in substantially real-time, such as by selectively adding and/or removing headings and subheadings.

Figure 36:
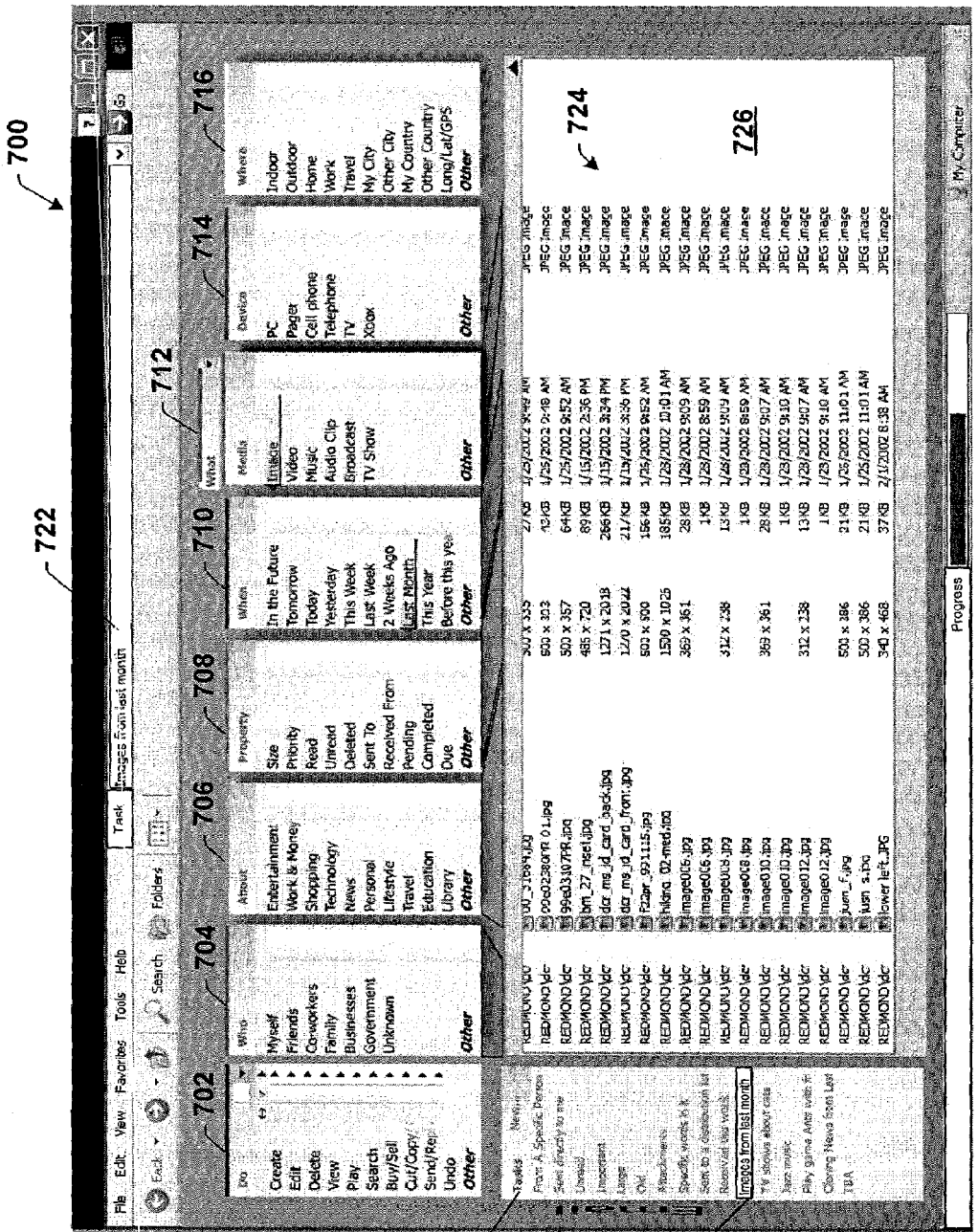
FIG. 36 is a screen shot illustrating an example of a user interface configured to display results of image documents retrieved in accordance with an aspect of the present invention.

In FIG. 36, the GUI 700 is being employed to retrieve a set of documents. In particular, the task window 722 displays "Images from last month", which corresponds to a natural language representation of the current filter. Appropriate headings and subheadings for this filter are selected from among the available dimensions 702–718. Specifically, WHEN/LAST MONTH and WHAT/MEDIA/IMAGE are selected to present corresponding results 724 of image items in the results pane 726. The selections could be made directly through the WHEN and WHAT dimensions 710 and 712, by enter a free text search of "Images from last month" in the window 722, or by selecting a predefined filter 740 from the predefined filter dimension 718.

Figure 37:
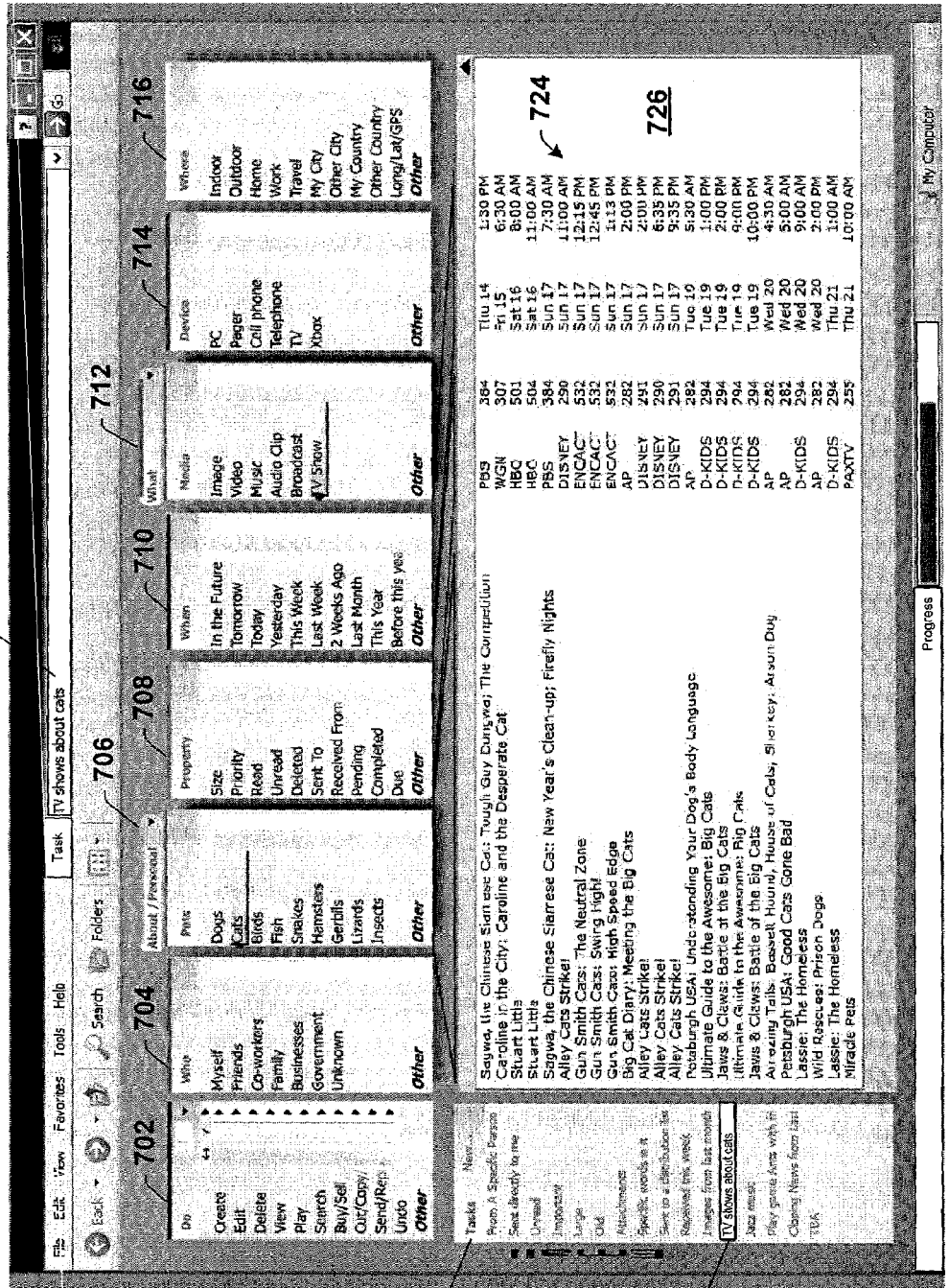
FIG. 37 is a screen shot illustrating an example of a user interface configured to display results of television shows matching a query implemented in accordance with an aspect of the present invention.

FIG. 37 is an example of the GUI 700 being employed to obtain information about particular types of media events or programs, namely "TV shows about cats", as indicated in the task window 722. The filter implemented in the GUI 700 thus corresponds to ABOUT/PERSONAL/PETS/CATS and WHAT/MEDIA/TV SHOW, which can be selected from the dimensions directly or a predefined heading of the task dimension 750 or by entering a free-text query in the window 722. The results items 724 presented in the results pane 726 provide interactive information listing television shows that satisfy the current filter. Thus, a user can select a given item, for example, to obtain additional information about a particular show or to program a recording device, such as a video cassette recorder, a personal video recorder or other recording device, to record the selected program. When a results item is selected to perform a task, appropriate headings and subheadings in the command-based interface would be selected. Alternatively or additionally, the user can modify the filter by selecting or deselecting headings.

By way of further illustration, the GUI 700 can be employed to implement a command interface, such as an electronic program guide, to facilitate viewing or recording of audio and/or visual programming. For example, available audio and/or visual programming data for respective programs may be filtered by metadata identifying a title, description, duration, rating, stars or hosts, broadcast date and time, genre or category of program, etc. Thus, by selecting appropriate headings from the GUI, corresponding information may be organized and presented as results items 724 in a corresponding results pane 726. Various headings and subheadings of the GUI 700 may, in turn, be employed to implement functionality (e.g., play or record or obtain additional information) relative to desired programming.

Figure 38:
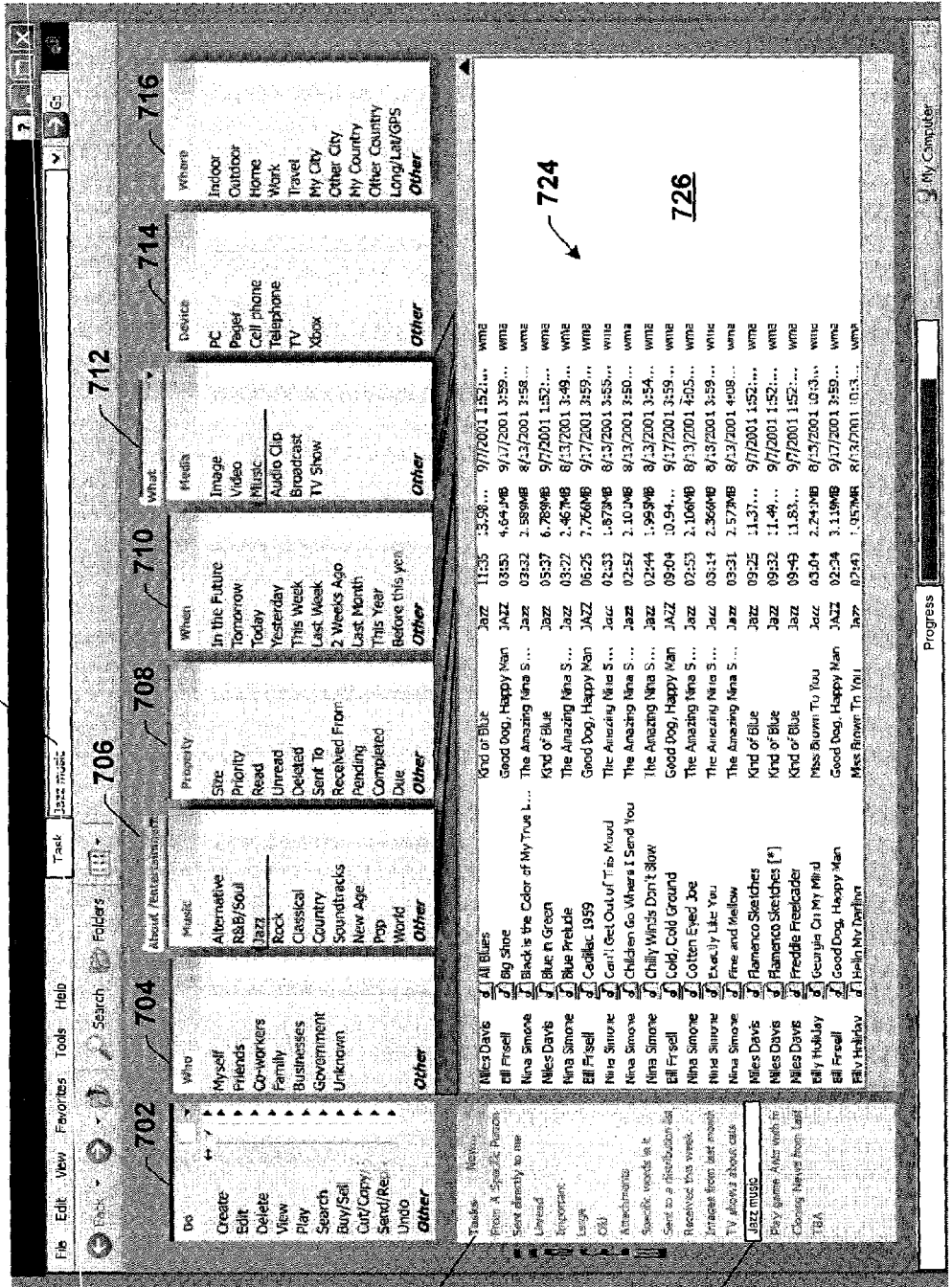
FIG. 38 is a screen shot illustrating an example of a user interface configured to display results of a query for jazz music implemented in accordance with an aspect of the present invention.

In FIG. 38, the GUI 700 is illustrated in connection with obtaining a list of available music selections, such as for jazz music. The task window 722 thus displays "Jazz music." The filter can be implemented, for example, by selecting a predefined JAZZ MUSIC task 760 or by selecting appropriate headings and subheadings from the taxonomy defined by dimensions 702–716 or by entering "jazz music" into the text-entry window 722. The results pane 726 thus presents the user with a list jazz music available to the user. The music selections can be arranged in a desired manner such as, for example, alphabetically by title (as shown), although other properties of the results items also could be used as sorting criteria.

Figure 39:
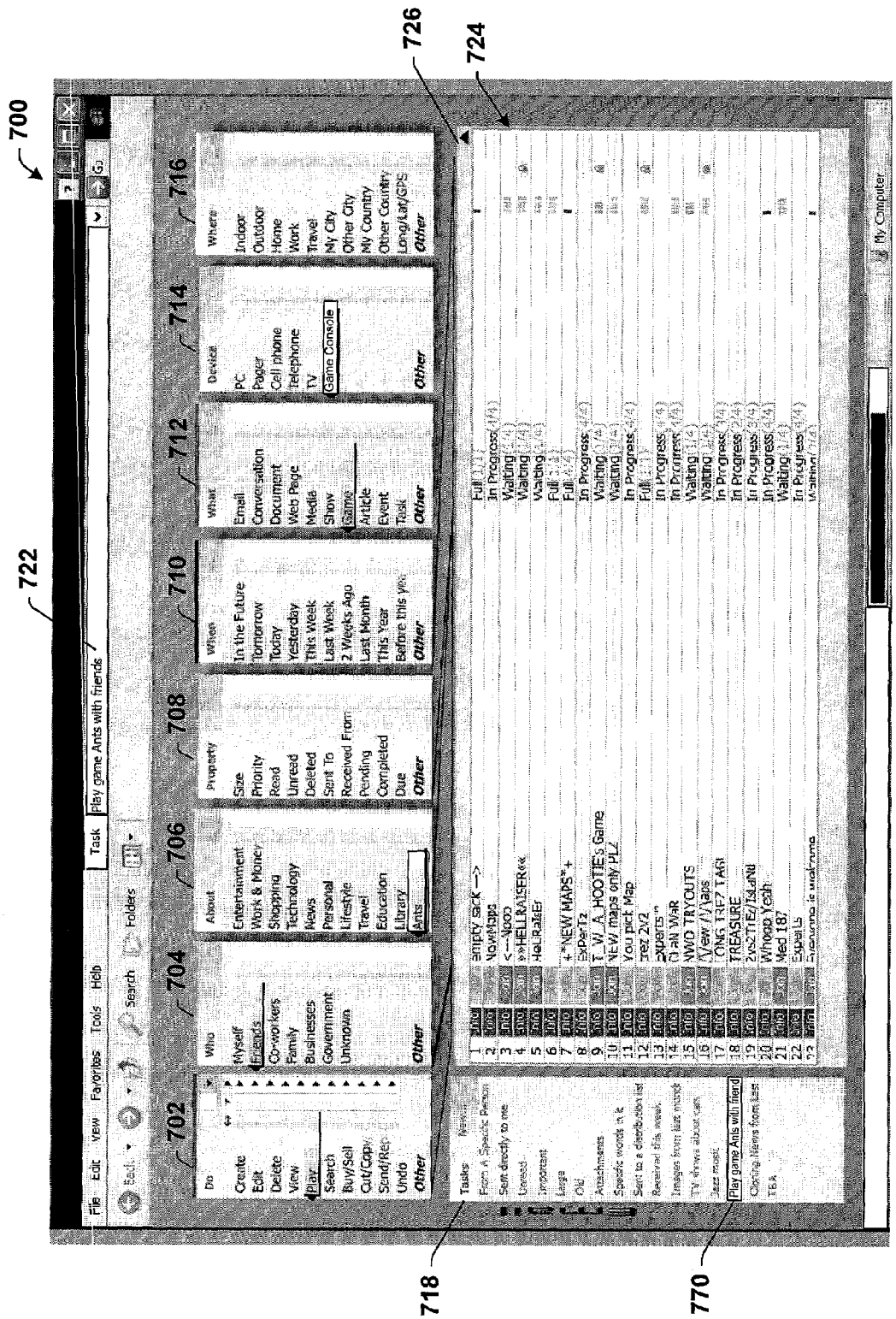
FIG. 39 is a screen shot illustrating an example of a user interface configured as a command interface for playing a multi-player video game in accordance with an aspect of the present invention.

FIG. 39 illustrates the GUI 700 implemented as a command interface according to an aspect of the present invention. In this particular example, the GUI 700 is being utilized to perform the task of "Play game Ants with friends", as indicated in the task window 722. The task selection can occur in response to selecting a predefined task 770 or by selecting corresponding headings and subheadings (e.g., DO/PLAY, WHO/FRIENDS, ABOUT/ANTS, WHAT/GAME and DEVICE/VIDEO PLAYER) from the taxonomy provided by the dimensions 702–716 or by entering an appropriate free-text task into the window 722. Results 724 for this task are presented in the results pane 726. The results 724 can include several columns of items including, for example, a title of a game, game status, an indication of the number of players, to name a few. In addition, a display object can be selected to join a particular game. Further, certain games can highlighted to indicate those game for which one or more friends or acquaintances belong, such as based on metadata associated with the particular instances of the respective games. An information button also may be associated with each game in the results 724, such as for obtaining additional information about the players associated with that game.

Figure 40:
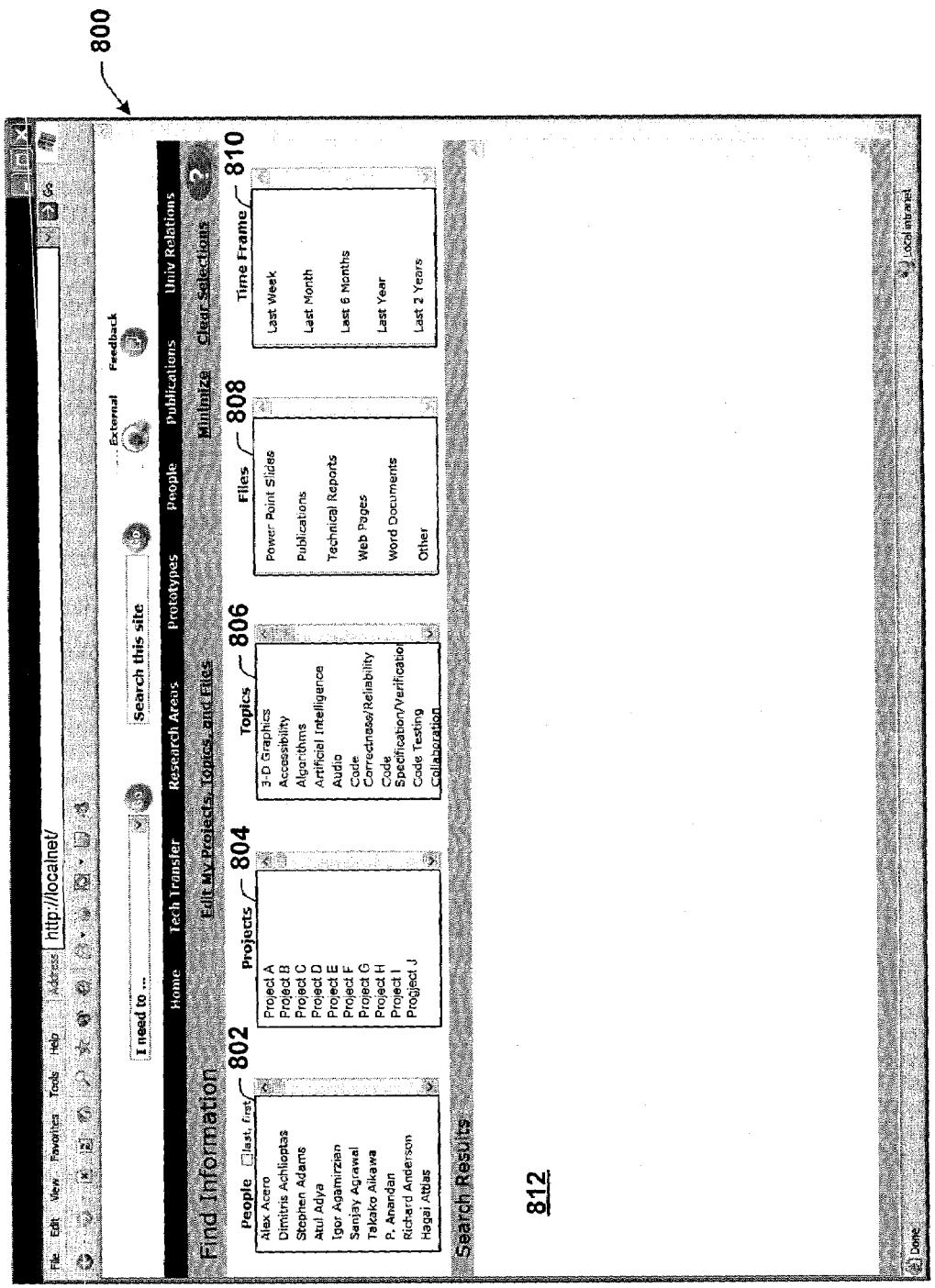
FIG. 40 is a screen shot illustrating an example of a user interface configured to facilitate accessing a corporate research database in accordance with an aspect of the present invention.

FIGS. 40–43 illustrate examples of an information interface 800 configured according to a taxonomy for implementing a corporate research database in accordance with an aspect of the present invention. For example, the interface 800 is provided in a Web browser for a company's intranet having an address of http://localnet/, although it is to be appreciated that, alternatively, such an interface could be provided as a Web-based interface via the Internet. The information interface 800 is depicted as having five high-level dimensions, namely, a PEOPLE dimension 802, a PROJECTS dimension 804, a TOPICS dimension 806, a FILES dimension 808 and a TIME FRAME dimension 810. It is to be appreciated that other taxonomy configurations could be used. The dimensions 802–810 are populated with headings for constructing filters as described herein. A results pane 812 is presented below the dimensions 802–810 for displaying search results for a filter being implemented. Initially, before constructing a filter, the results pane 812 is empty, as shown in FIG. 40.

Figure 41:
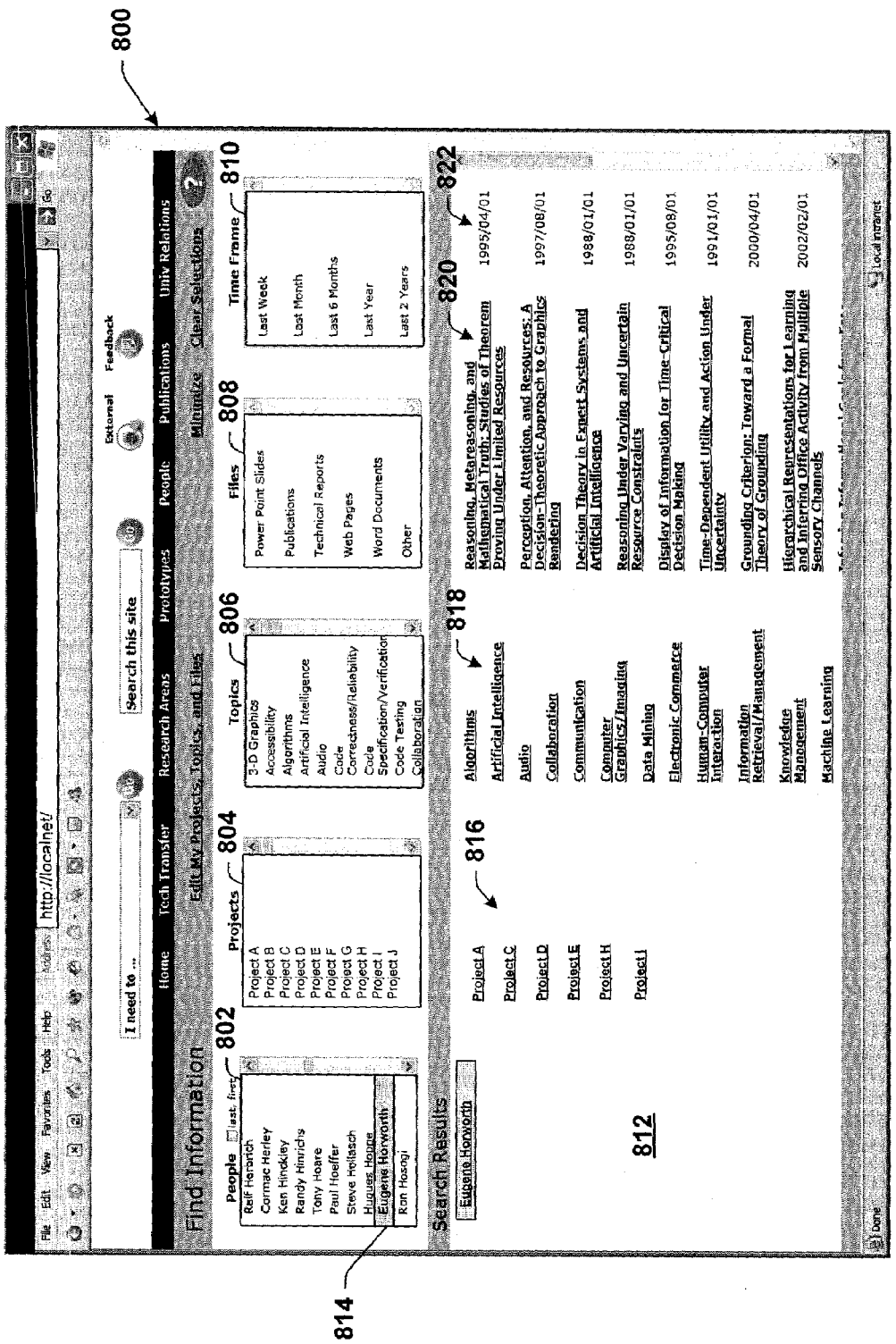
FIG. 41 is a screen shot illustrating an example of the user interface of FIG. 40 configured to display results of items related to a selected person in accordance with an aspect of the present invention.

In FIG. 41, the interface is configured to implement a filter to access information relating to a person (e.g., Eugene Horworth) 814 selected from the PEOPLE dimension 802. As a result of the selected person, the results pane 812 is populated with information associated with that person. In this example, the information is arranged in columns 816–822 of related information items. In particular, one column 816 presents projects with which the person is associated, another column 818 presents topics with which the person is associated, another column 820 lists files, such as publications or technical reports, associated with the selected person and column 822 provides dates for the displayed items.

Figure 42:
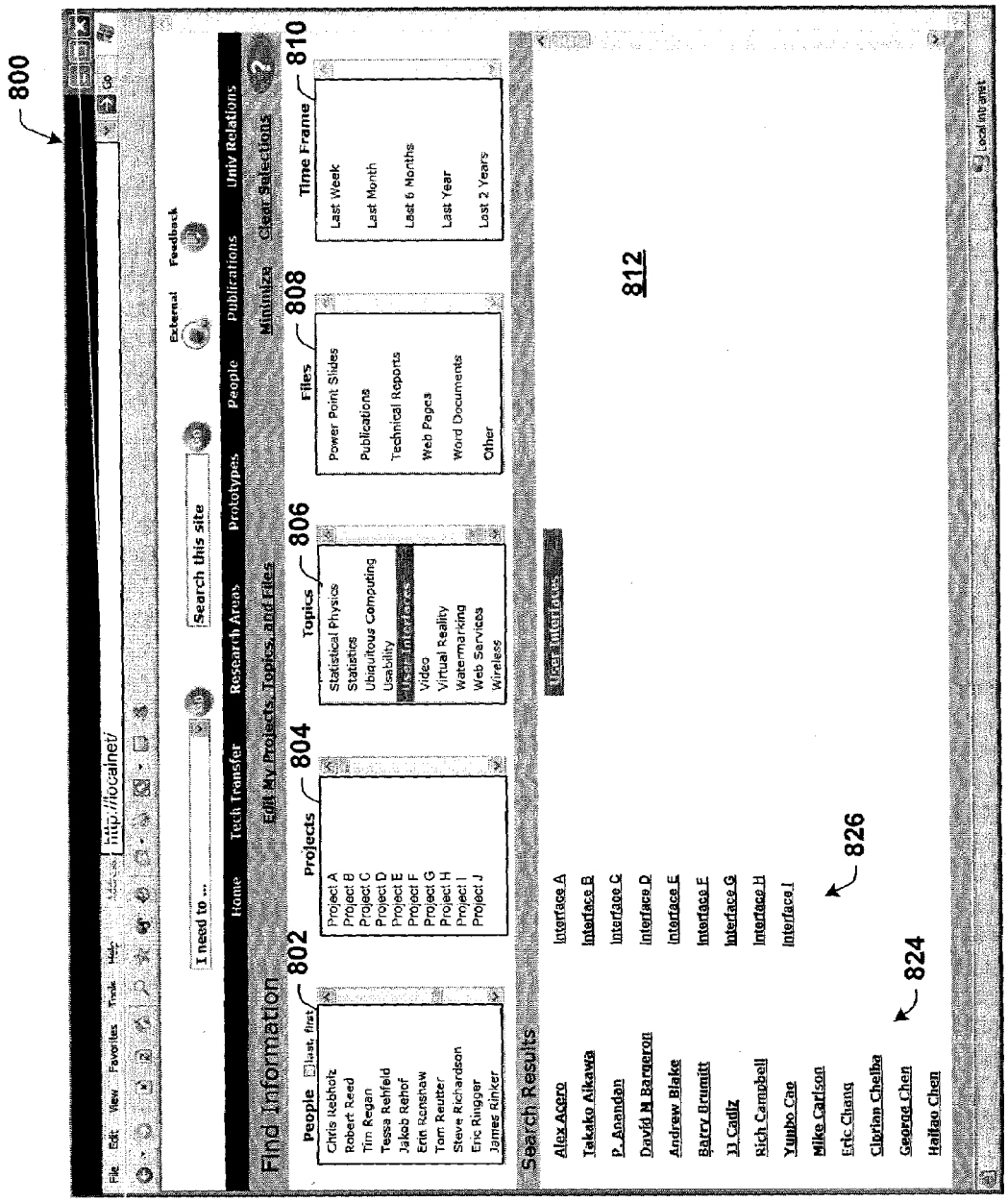
FIG. 42 is a screen shot illustrating an example of the user interface of FIG. 40 configured to display results of items related to a selected topic in accordance with an aspect of the present invention.

FIG. 42 depicts the interface 800 configured to display information about a selected heading in the TOPIC dimension 806, namely about user interfaces. Results satisfying the filter are presented in the results pane 812. The results include, for example, a list 824 of persons having a relationship with the selected topic and a list 826 of user interfaces. The results could be narrowed by selecting additional headings or subheadings, as described herein. In addition, more specific relationships between people and the user interfaces could be presented by further selecting people and/or interfaces (see, e.g. FIGS. 25–29).

Figure 43:
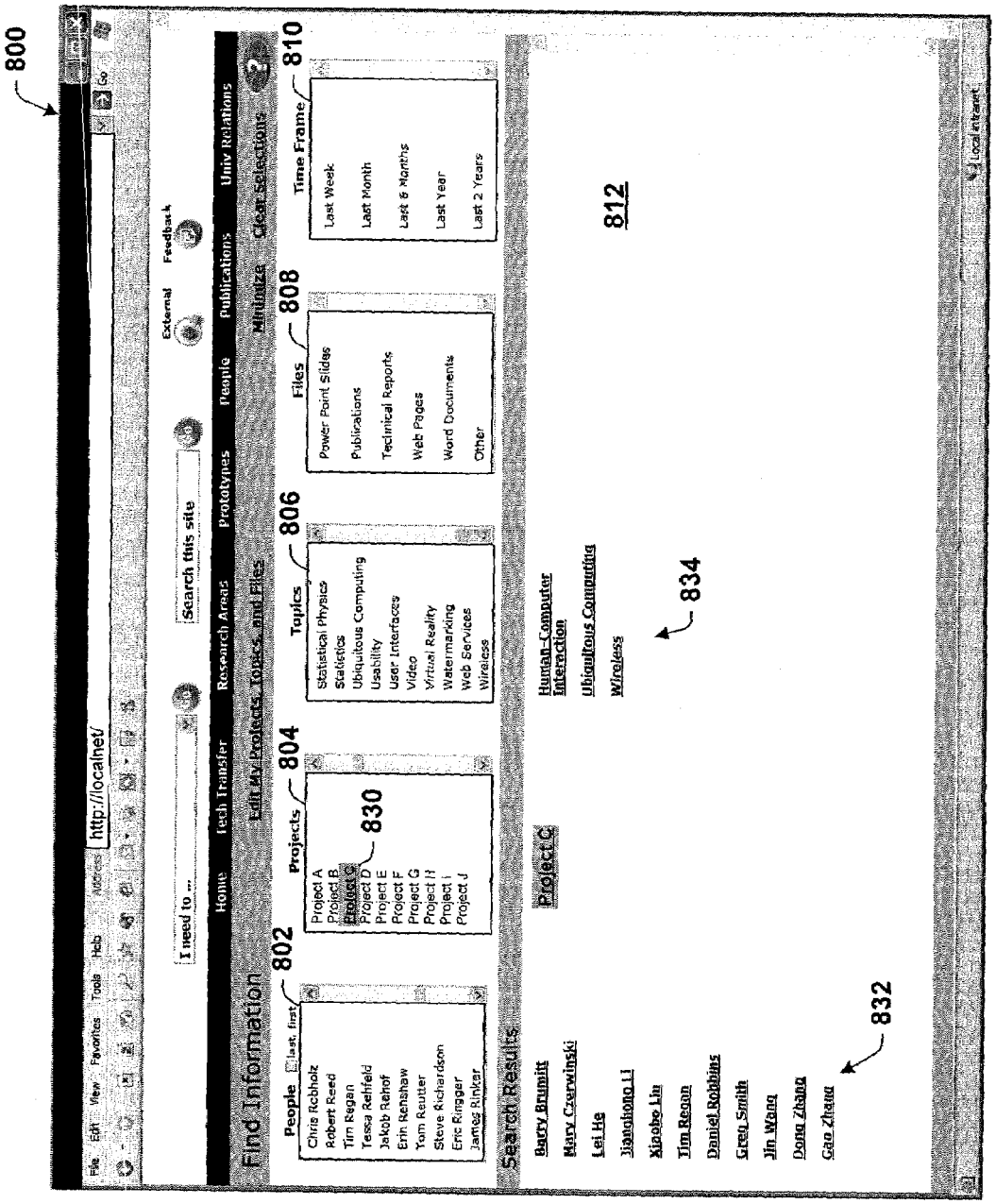
FIG. 43 is a screen shot illustrating an example of the user interface of FIG. 40 configured to display results of items related to a selected project in accordance with an aspect of the present invention.

FIG. 43 illustrates an example in which a particular project (e.g., Project C) has been selected from the PROJECTS dimension 804. Thus, a list of persons associated with Project C, indicated at 832, as well as a list of topics relating to this project, indicated at 834, are presented in the results pane 812.

Figure 44:
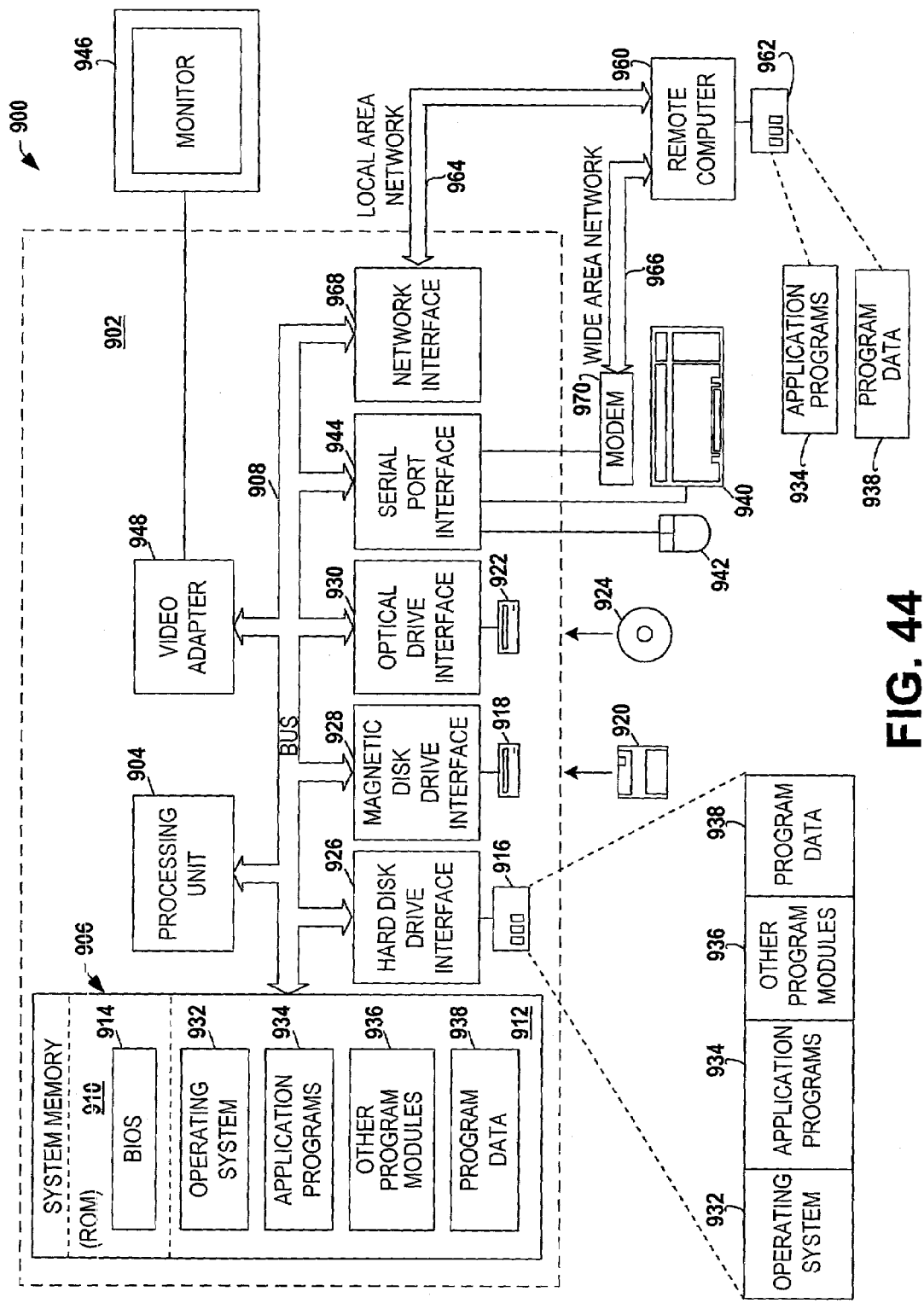
FIG. 44 is an example of a possible operating environment in which various aspects of the present invention can be implemented.

In order to provide additional context for various aspects of the present invention, FIG. 44 and the following discussion are intended to provide a brief, general description of one possible suitable environment 900 in which the various aspects of the present invention may be implemented. It is to be appreciated that the computing environment 900 is but one possible computing environment and is not intended to limit the environments with which the present invention can be employed. Those skilled in the art will appreciate that the inventive methods may be practiced with other system configurations, including single-processor or multiprocessor computer systems, minicomputers, mainframe computers, as well as personal computers, hand-held computing devices, microprocessor-based or programmable consumer electronics, video game consoles, and the like.

The illustrated aspects of the invention may also be practiced in distributed computing environments where certain tasks are performed by remote processing devices that are linked through a communications network. In a distributed computing environment, program modules may be located in both local and remote memory storage devices. In such a distributed environment, for example, one or more central services can process interactions and requests from multiple users and make improvements to the taxonomy based on the interactions and requests. The improvements can be global in scale (e.g., propagated to the taxonomy that is presented to each user), individual for each user, or be applied to selected set of plural users. Additionally, certain taxonomical changes can be implemented in different dimensions for different users, such as based on usage by the user and/or other user characteristics (e.g., user profile, such as entered by the user or determined algorithmically).

While various aspects of the present invention have been described above in the general context of computer-executable instructions that may run on one or more computers or other microprocessor-based equipment, it is to be recognized that the invention also may be implemented in combination with other program modules and/or as a combination of hardware and software. Generally, program modules include routines, programs, components, data structures, etc. that perform particular tasks or implement particular abstract data types.

FIG. 44 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 44, the exemplary environment 900 for implementing various aspects of the invention includes a computer 902, including a processing unit 904, a system memory 906, and a system bus 908 that couples various system components including the system memory to the processing unit 904. The processing unit 904 may be any of various commercially available processors. Dual microprocessors and other multi-processor architectures also can be used as the processing unit 904. The computer 902 and/or portions thereof may be implemented as any electronic appliance operable to communicate with a Web-based service, such as, for example, a telephone (wired or wireless), a personal computer (PC) (e.g., handheld, desktop, portable, etc.), a roaming PC, a PDA, game console or entertainment appliance, or any other suitable microprocessor-based appliance.

The system bus 908 may be any of several types of bus structure including a memory bus or memory controller, a peripheral bus, and a local bus using any of a variety of commercially available bus architectures. The system memory 906 includes read only memory (ROM) 910 and random access memory (RAM) 912. A basic input/output system (BIOS) 914, containing the basic routines that help to transfer information between elements within the computer 902, such as during start-up, is stored in ROM 912.

The computer 902 may further include a hard disk drive 916, a magnetic disk drive 918, e.g., to read from or write to a removable disk 920, and an optical disk drive 922, e.g., for reading and/or writing data relative to 924 optical media. The hard disk drive 916, magnetic disk drive 918, and optical disk drive 922 are connected to the system bus 908 by a hard disk drive interface 926, a magnetic disk drive interface 928, and an optical drive interface 930, respectively.

The computer 902 typically includes at least some form of computer readable media. Computer readable media can be any available media that can be accessed by the computer 902. By way of example, computer readable media may comprise computer storage media and communication media. Computer storage media may include volatile and nonvolatile, removable and non-removable media implemented in any method or technology for storage of information such as computer readable instructions, data structures, program modules, or other data. Computer storage media may include RAM, ROM, EEPROM, flash memory or other memory technology, CD-ROM, digital versatile disks (DVD), or other magnetic storage devices, or any other medium which can be used to store the desired information and which can be accessed by the computer 902. Communication media typically embodies computer readable instructions, data structures, program modules or other data in a modulated data signal such as a carrier wave or other transport mechanism and includes any information delivery media. A modulated data signal includes a signal that has one or more of its characteristics set or changed in such a manner as to encode information provided in the signal. By way of example, communication media may include wired media such as a wired network or direct-wired connection, and wireless media such as acoustic, RF, optical and other wireless media. Combinations of any of the above should also be included within the scope of computer readable media.

A number of program modules may be stored in the drives and RAM 912, including an operating system 932, one or more application programs 934, other program modules 936, and program non-interrupt data 938. The operating system 932 in the illustrated computer can be any of a number of commercially available or proprietary operating systems. For example, the application programs and/or other program modules can include computer executable instructions for performing various features of the information and/or command interface described herein.

A user may enter commands and information into the computer 902 through a keyboard 940 and a pointing device, such as a mouse 942. Other input devices (not shown) may include a microphone (e.g., for voice data inputs), an IR remote control, a joystick, a game pad, a satellite dish, a scanner, or the like. These and other input devices are often connected to the processing unit 904 through a serial port interface 944 that is coupled to the system bus 908, but may be connected by other interfaces, such as a parallel port, a game port, a Universal Serial Bus ("USB"), an IR interface, etc. A monitor 946, or other type of display device, is also connected to the system bus 908 via an interface, such as a video adapter 948. In addition to the monitor, a computer can include other peripheral output devices (not shown), such as speakers, printers etc.

The computer 902 may operate in a networked environment using logical connections to one or more remote computers, such as a remote computer(s) 960. The remote computer(s) 960 may be a workstation, a server computer, a router, a personal computer, a microprocessor based entertainment appliance, a peer device, or other common network node. The remote computer may include many or all of the elements described relative to the computer 902, although, for purposes of brevity, only a memory 962 is illustrated. For example, memory 962 can include one or more databases that form an information and/or command space from which an interface running on the computer 902 can access information according to filter constructed according to an aspect of the present invention. The logical connections depicted include a local area network (LAN) 964 and a wide area network (WAN) 966, such as the Internet. Such networking environments are commonplace in offices, enterprise-wide computer networks, intranets, and the Internet.

When used in a LAN networking environment, the computer 902 is connected to the local network 964 through a network interface or adapter 968. When used in a WAN networking environment, the computer 902 typically includes a modem 970, or is connected to a communications server on the LAN, or has other means for establishing communications over the WAN 966. The modem 970, which may be internal or external relative to the computer 902, is connected to the system bus 908 via the serial port interface 944. In a networked environment, program modules 936, application programs, or portions thereof, may be stored in the remote memory storage device 962. Similarly, when the computer 902 portions of the information/command space can be stored in memory 926, 928, 930 of the computer 902 or remote memory 962. It will be appreciated that the network connections shown are exemplary and other means of establishing a communications link between the computers can be used.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A user interface, comprising:
a visualization of a plurality of dimensions that represent an information taxonomy for an associated information/command space, the dimensions including user-selectable headings derived from metadata associated with commands and data items in the information/command space and redundant headings representing metadata at different locations in the information/command taxonomy, the headings include a heading indicating at least one action to perform and at least one device or application relative to which the action is to be performed; and
a results component that visualizes results items as a function of a filter constructed based on at least one selected heading, the visualized results items corresponding to commands and data items metadata that substantially satisfy the filter, the filter including a command filter that sorts commands based on metadata associated with the headings such that at least one of the results items corresponds to a specified task.

2. The user interface of claim 1, at least some of the headings including subheadings arranged according to the information taxonomy to represent hierarchal relationships between the at least some of the headings and associated subheadings.

3. The user interface of claim 1, further comprising a language engine operative to derive a phrase as a function of the filter, the phrase being visualized to the user.

4. The user interface of claim 3, the language engine providing natural language feedback to the user as a function of the filter, the natural language feedback indicating inherent structure of the filter to familiarize the user with the information taxonomy.

5. The user interface of claim 1, further comprising a language engine that converts language-based user inputs into headings that define the filter, the headings that define the filter being visualized in the user interface by selecting corresponding headings of the filter.

6. The user interface of claim 1, further comprising an analysis system operative to monitor selections and changes requested by plural users and dynamically adjust the taxonomy based on the selections and changes.

7. The user interface of claim 1, further comprising a language engine that generates synonyms as a function of a selected heading.

8. The user interface of claim 7, the language generator being associated with an input field, the language generator operative to identify possible synonyms of an input term provided into the input field by visually modifying a visual characteristic of headings that correspond to the possible synonyms.

9. The user interface of claim 1, the results component indicating relationships between results items based on the metadata of items indicating the relationships.

10. The user interface of claim 9, the results component visualizing relationships between related results items presented in the user interface based on at least one of a user-selected results item and a sort criteria of the filter.

11. The user interface of claim 10, the sort criteria of the filter comprising a dimension of the taxonomy from which the filter is constructed, a relationship between related results items that satisfy the filter being represented as a relative location of the related results items to each other in the visualization.

12. The user interface of claim 1, further comprising a data manager programmed to at least one of add or modify associated metadata for implicitly related data items in the information/command space based on other metadata of the implicitly related data items indicating a likely relationship between the respective data items.

13. The user interface of claim 1, further comprising an interface manager that enables the user to modify or remove assignable metadata for at least one selected data item in the information/command space.

14. The user interface of claim 1, the user interface further comprising an interface manager programmed to add or modify assignable metadata for the taxonomy and the visualization associated with at least one of the dimensions that represent the taxonomy so as to enable a user to so as to adjust the taxonomy.

15. The user interface of claim 14, the assignable metadata including a heading in at least one dimension of the taxonomy.

16. The user interface of claim 15, the interface manager programmed to add a heading to at least one dimension of the taxonomy corresponding to a user-defined filter constructed based on at least one selected heading in the visualization.

17. The user interface of claim 14, further comprising an analysis component programmed to monitor changes relating to the assignable metadata and to adjust metadata for the taxonomy and the visualization of at least one of the dimensions that represent the taxonomy in response to plural users making similar changes relating to the assignable metadata.

18. The user interface of claim 1, further comprising a feedback component programmed to implement feedback relative to the user interface based on user inputs.

19. The user interface of claim 18, the feedback component implementing predictive feedback at the user interface to indicate at least one possible consequence of modifying the filter.

20. The user interface of claim 19, the predictive feedback being graphically represented in relation to at least one visualized heading to indicate at least one of a number of results and a time to retrieve results if the filter were modified by selecting at least one visualized heading.

21. The user interface of claim 20, the feedback component being user-selectable to enable or disable the predictive feedback.

22. The user interface of claim 1, the results component organizing the results items into at least two categories to indicate relevancy of the results items relative to the filter.

23. The user interface of claim 1, the dimensions and results items being presented to the user concurrently to facilitate iterative modifications to the filter in response to selecting or deselecting headings, the results component visualizing corresponding results items to reflect the modifications to the filter.

24. The user interface of claim 1, the visualization further comprising groups of headings arranged into different respective ones of the dimensions, the user interface further comprising a filter generator that generates an expression as a function of selected headings by applying a first operator to headings selected within a given group and by applying a second operator between headings selected in different groups.

25. The user interface of claim 1, the expression further comprising a Boolean expression in which the first operator is an OR operator and the second operator is an AND operator.

26. The user interface of claim 25, the groups of headings are visualized as respective columns of headings.

27. A graphical user interface system, comprising
means for interactively visualizing a plurality of dimensions that represent an information taxonomy for an associated information space/command space;
means for interactively visualizing headings of respective dimensions;
means for selecting at least one heading, the at least one heading derived from metadata associated with commands and data items in the information/command space;
means for filtering data items in the information/command space based on the selected at least one heading;
means for filtering commands based on metadata associated with the at least one heading, such that at least one of a results item corresponds to a specified task; and
means for presenting results items based on the filtered data items that substantially satisfy the filtered data items.

28. A method to facilitate specification of queries or tasks, comprising:
visualizing as a graphical user interface a plurality of dimensions that represent an information taxonomy for an associated information/command space, the dimensions including interactive headings derived from metadata associated with commands and data items in the information/command space;
selecting at least one heading;
filtering data items in at least a portion of the information/command space based on the selected at least one heading;
generating a filter based on which the filtering is performed the filter including an information filter and a command filter; and
presenting results items corresponding to data items that substantially satisfy the filtered data items.

29. The method of claim 28, at least some of the headings including subheadings arranged according to the information taxonomy to represent hierarchal relationships between the at least some of the headings and associated subheadings.

30. The method of claim 28, further comprising determining a natural language phrase that represents the filter and visualizing the phrase to the user.

31. The method of claim 30, providing natural language feedback to the user as a function of the filter, the natural language feedback indicating changes to the filter in response to selecting at least one other of the headings or deselecting the at least one heading.

32. The method of claim 28, further comprising converting a language-based user input into headings that define the filter, and visualizing filter criteria in the user interface according the headings that define the filter.

33. The method of claim 28, further comprising determining at least one synonym as a function of a selected heading and presenting a list of the at least one synonym superimposed on the user interface.

34. The method of claim 28, further comprising determining at least one synonym as a function of at least one user input term, identifying possible synonyms of the input term in the information taxonomy, and visually modifying a visual characteristic of headings that correspond to the identified possible synonyms.

35. The method of claim 34, further comprising monitoring modifications to headings for a plurality of user interfaces and, in response to detecting plural similar changes to the headings, adjusting the taxonomy to present headings in at least a subset of user interfaces in a manner more suitable to the subset of user interfaces.

36. The method of claim 28, at least part of the information space including a task space, the method comprising sorting commands from the task space based on command parameters of the filter, such that at least one of the results items corresponds to a specified task.

37. The method of claim 28, further comprising indicating at least one relationship between results items based on the metadata of the results items indicating the at least one relationship.

38. The method of claim 37, further comprising visualizing relationships between related results items presented in the user interface based on at least one of a user selecting one of the related results items and sorting criteria employed during the filtering.

39. The method of claim 38, the sorting criteria comprising a dimension of the taxonomy from which the filter is constructed, the method further comprising representing a relationship between related results items that satisfy the filter as a relative location of the related results items to each other in a graphical visualization that includes the results items.

40. The method of claim 28, further comprising at least one of adding or modifying associated metadata for at least two data items in the information space based on other metadata of the at least two data items indicating an implicit relationship between the respective data items.

41. The method of claim 28, selectively modifying assignable metadata of at least one selected data item in the information space.

42. The method of claim 41, the assignable metadata including a heading in at least one dimension of the taxonomy.

43. The method of claim 41, further comprising adding a heading to at least one dimension of the taxonomy corresponding to a user-defined filter constructed based on at least one selected heading.

44. The method of claim 41, further comprising monitoring changes relating to the assignable metadata and, in response to a plurality of similar changes being made relating to the assignable metadata, adjusting metadata for the taxonomy and the visualization thereof.

45. The method of claim 28, further comprising implementing feedback relative to the user interface based on user inputs to facilitate iterative.

46. The method of claim 45, further comprising implementing predictive feedback and visualizing the predictive feedback at the user interface to indicate at least one possible consequence of modifying the filter.

47. The method of claim 45, graphically representing the predictive feedback visually associated with at least one heading to indicate at least one of a number of results and a time to retrieve results if the filter were modified by adding or removing the at least one heading.

48. The method of claim 28, further comprising organizing the results items into at least two categories to indicate relevancy of the results items relative to the selected at least one heading.

49. The method of claim 28, further comprising redundantly representing metadata at different locations in the taxonomy.

50. The method of claim 28, concurrently presenting the dimensions and the results items to the user to facilitate iterative modifications to the filtering in response to selecting or deselecting headings, and visualizing corresponding results items to reflect modifications to the filter.

51. The method of claim 50, the filter generation further comprising generating the filter as an expression functionally related to selected headings by applying a first operator to headings selected within a given dimension and by applying a second operator between headings selected in different dimensions.

52. The method of claim 51, the first operator being an OR operator and the second operator being an AND operator.

53. A computer-readable medium having computer-executable instructions for:
visualizing a plurality of dimensions that represent an interactive information taxonomy for an associated information/command space, the dimensions including headings derived from metadata associated with commands and data items in the information/command space;
selecting at least one heading;
filtering data items in the information/command space based on the selected at least one heading;
generating a filter based on which the filtering is performed, the filter including an information filter and a command filter; and
presenting results items based on the filtered data items that substantially satisfy the filtered data items.

* * * * *